(12) United States Patent
Labbe et al.

(10) Patent No.: US 12,049,283 B2
(45) Date of Patent: *Jul. 30, 2024

(54) SYSTEM FOR SECURING AN ACCESSORY TO A VEHICLE

(71) Applicant: BOMBARDIER RECREATIONAL PRODUCTS INC., Valcourt (CA)

(72) Inventors: Christian Labbe, Magog (CA); Francois Chenevert, Sherbrooke (CA); Mathieu Mercier, Sherbrooke (CA); Alain Massicotte, Orford (CA); Ivan Brousseau, Montreal (CA); Thierry Cotnoir, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,724

(22) Filed: Apr. 4, 2023

(65) Prior Publication Data

US 2023/0242216 A1 Aug. 3, 2023

Related U.S. Application Data

(60) Continuation of application No. 17/718,003, filed on Apr. 11, 2022, now Pat. No. 11,685,473, which is a
(Continued)

(51) Int. Cl.
*B62M 27/02* (2006.01)
*B60P 7/08* (2006.01)
*B60R 9/06* (2006.01)

(52) U.S. Cl.
CPC ........... *B62M 27/02* (2013.01); *B60P 7/0807* (2013.01); *B60R 9/06* (2013.01); *B62M 2027/028* (2013.01)

(58) Field of Classification Search
CPC ...... B61D 45/00; B60P 7/0815; B60P 7/0807; B62M 27/02; B62M 2027/028; B60R 9/06; B60R 2011/0042
See application file for complete search history.

(56) References Cited

U.S. PATENT DOCUMENTS

| 2,676,680 A | 4/1954 | Kindorf |
| 3,145,441 A | 8/1964 | Strandrud |

(Continued)

FOREIGN PATENT DOCUMENTS

| CN | 101287885 A | 10/2008 |
| CN | 101338848 A | 1/2009 |

(Continued)

OTHER PUBLICATIONS

'The New 2013 Summit®: Making It Yours.' YOUTUBE, [Online] Feb. 15, 2012, Retrieved from http://www.youtube.com/watch?v=IQrOdBtyBWU> on Aug. 13, 2013.
(Continued)

*Primary Examiner* — Brian D Nash
(74) *Attorney, Agent, or Firm* — BCF LLP

(57) ABSTRACT

An anchor for use with a rack, an accessory rack, and a system for securing an accessory to a vehicle. The anchor includes an anchor case, the anchor case having a rack connecting part for making contact with the rack and an accessory connecting part for making contact with an accessory; at least one cam rotatably connected to the anchor below the rack connecting part, the at least one cam being rotatable about an axis between a locked position and an unlocked position to selectively secure the anchor and the accessory to the rack; and a lever operatively connected to the at least one cam, the lever being rotatable by a user in order to cause the at least one cam to rotate between the locked position and the unlocked position, the rack connect-
(Continued)

ing part being positioned between the at least one cam and the accessory connecting part along the axis.

17 Claims, 35 Drawing Sheets

Related U.S. Application Data continuation of application No. 17/077,436, filed on Oct. 22, 2020, now Pat. No. 11,767,083, which is a division of application No. 15/662,877, filed on Jul. 28, 2017, now Pat. No. 10,850,806, which is a division of application No. 14/389,476, filed as application No. PCT/US2013/034391 on Mar. 28, 2013, now Pat. No. 9,751,592.

(60) Provisional application No. 61/618,505, filed on Mar. 30, 2012.

(56) References Cited

U.S. PATENT DOCUMENTS

| | | | |
|---|---|---|---|
| 3,554,075 A | | 1/1971 | Johnson |
| 3,625,405 A | | 12/1971 | Kezar et al. |
| 3,749,438 A | | 7/1973 | Loomis et al. |
| 3,779,597 A | | 12/1973 | Ushida |
| 3,970,345 A | | 7/1976 | Holcomb |
| 4,059,207 A | | 11/1977 | Jackson et al. |
| 4,261,496 A | | 4/1981 | Mareydt et al. |
| 4,266,703 A | | 5/1981 | Litz |
| 4,274,568 A | | 6/1981 | Bott |
| 4,311,261 A | | 1/1982 | Anderson et al. |
| 4,516,709 A | | 5/1985 | Bott |
| 4,726,439 A | | 2/1988 | Iwao et al. |
| 4,991,271 A | | 2/1991 | Bauer et al. |
| 5,025,883 A | | 6/1991 | Morinaka et al. |
| 5,123,795 A | | 6/1992 | Engel et al. |
| 5,155,960 A | | 10/1992 | Shaanan |
| 5,251,345 A | | 10/1993 | Pechner |
| 5,273,330 A | | 12/1993 | Petry et al. |
| 5,306,064 A | | 4/1994 | Padovano et al. |
| 5,435,471 A | * | 7/1995 | Chuang .................... B62J 9/27 224/419 |
| 5,558,260 A | | 9/1996 | Reichert |
| 5,628,598 A | * | 5/1997 | Hofle .................... F16B 37/045 411/432 |
| 5,655,865 A | | 8/1997 | Plank et al. |
| 5,725,138 A | | 3/1998 | Zagrodnik |
| 5,738,471 A | | 4/1998 | Zentner et al. |
| 5,794,901 A | * | 8/1998 | Sigel .................... G09B 25/02 248/221.11 |
| 5,947,356 A | | 9/1999 | Delong |
| 6,022,164 A | * | 2/2000 | Tsui .................... B66C 1/66 294/215 |
| 6,081,186 A | * | 6/2000 | Adams .................... B60R 25/1001 200/61.81 |
| 6,237,970 B1 | | 5/2001 | Joannou |
| 6,257,261 B1 | | 7/2001 | Johnson |
| 6,290,426 B1 | * | 9/2001 | van Gijsel .................... F16B 7/044 403/247 |
| 6,299,042 B1 | | 10/2001 | Smith |
| 6,336,779 B1 | * | 1/2002 | Jakob .................... F16B 35/041 411/311 |
| 6,338,649 B1 | * | 1/2002 | Smith .................... H01R 11/282 439/504 |
| 6,354,476 B1 | | 3/2002 | Alderman |
| 6,474,921 B1 | | 11/2002 | Gordon |
| 6,534,650 B2 | | 3/2003 | Klimkowski |
| 6,585,465 B1 | | 7/2003 | Hammond et al. |
| 6,623,071 B2 | | 9/2003 | Kawamoto et al. |
| 6,631,835 B2 | * | 10/2003 | Fang .................... B62J 9/30 224/431 |
| 6,729,818 B1 | | 5/2004 | Yee |
| 6,749,036 B1 | | 6/2004 | Schrapp et al. |
| 6,840,417 B2 | | 1/2005 | Heinrich et al. |
| 6,884,011 B1 | | 4/2005 | Saward |
| 7,040,849 B2 | | 5/2006 | Cunningham et al. |
| 7,156,593 B1 | * | 1/2007 | Saward .................... B60P 7/0815 410/104 |
| 7,165,702 B1 | | 1/2007 | Billberg |
| 7,175,377 B2 | | 2/2007 | Womack et al. |
| 7,393,168 B2 | | 7/2008 | Wei |
| 7,497,651 B2 | | 3/2009 | Harberts et al. |
| 7,874,774 B2 | | 1/2011 | Peterson |
| 8,277,157 B2 | | 10/2012 | Parsons |
| 8,465,242 B2 | * | 6/2013 | Arendt .................... F16B 7/187 411/85 |
| 8,550,757 B2 | | 10/2013 | Anderson et al. |
| 8,777,531 B2 | | 7/2014 | Massicotte et al. |
| 8,875,830 B2 | | 11/2014 | Massicotte et al. |
| 8,925,965 B2 | | 1/2015 | Pecora |
| 9,248,878 B2 | | 2/2016 | Lim |
| 9,302,851 B2 | | 4/2016 | Esser et al. |
| 9,409,509 B2 | | 8/2016 | Bohlke et al. |
| 9,422,957 B2 | * | 8/2016 | Dinh .................... F24S 25/636 |
| 9,499,088 B1 | | 11/2016 | Fenchak et al. |
| D830,948 S | * | 10/2018 | Fenchak .................... D12/414 |
| 10,227,110 B1 | | 3/2019 | Valence et al. |
| 10,994,793 B2 | * | 5/2021 | Ward .................... B62D 53/0807 |
| 11,085,579 B2 | * | 8/2021 | Carnevali .................... F16M 13/02 |
| 2002/0102145 A1 | | 8/2002 | Grandy |
| 2005/0006167 A1 | | 1/2005 | Bertrand et al. |
| 2005/0036848 A1 | | 2/2005 | Cunningham et al. |
| 2005/0051575 A1 | | 3/2005 | Durivage |
| 2005/0092797 A1 | | 5/2005 | Takahashi et al. |
| 2005/0123379 A1 | | 6/2005 | Barina et al. |
| 2005/0150921 A1 | | 7/2005 | Schneider |
| 2005/0175426 A1 | | 8/2005 | Kroll et al. |
| 2006/0086552 A1 | | 4/2006 | Vaisanen |
| 2006/0138185 A1 | | 6/2006 | Lien et al. |
| 2006/0188355 A1 | | 8/2006 | Warnock |
| 2006/0266777 A1 | | 11/2006 | Huang |
| 2008/0083801 A1 | | 4/2008 | Knoch et al. |
| 2008/0087782 A1 | | 4/2008 | Sutherland et al. |
| 2008/0272165 A1 | | 11/2008 | Mcmillan |
| 2009/0152313 A1 | | 6/2009 | Gandy et al. |
| 2010/0147916 A1 | | 6/2010 | Roberts et al. |
| 2010/0186466 A1 | | 7/2010 | Frantz |
| 2013/0043289 A1 | | 2/2013 | Visenzi |
| 2013/0094920 A1 | | 4/2013 | Massicotte et al. |
| 2013/0133964 A1 | | 5/2013 | Massicotte et al. |
| 2014/0374564 A1 | | 12/2014 | Schroeder et al. |
| 2015/0089778 A1 | | 4/2015 | Tisol |
| 2015/0191210 A1 | | 7/2015 | Visenzi |
| 2015/0197301 A1 | | 7/2015 | Armstrong et al. |
| 2015/0210355 A1 | | 7/2015 | Labbe et al. |
| 2018/0051735 A1 | | 2/2018 | Stenyakin |
| 2022/0135145 A1 | | 5/2022 | Veillette et al. |

FOREIGN PATENT DOCUMENTS

| | | |
|---|---|---|
| DE | 10392457 T5 | 3/2005 |
| EP | 2030879 B1 | 1/2010 |
| FR | 2817927 A1 | 6/2002 |
| FR | 2894304 A1 | 6/2007 |
| RU | 2334615 C2 | 9/2008 |
| WO | 2012002959 A1 | 1/2012 |

OTHER PUBLICATIONS

International Search Report of PCT/US2013/034391, Blaine R. Copenheaver, Aug. 26, 2013.
International Search Report of PCT/US2010/040629, Blaine R. Copenheaver, Sep. 1, 2010.
Decision for Granting a Patent issued by the Russian Patent Office in connection with Russian Application No. 2014141016 on Feb. 8, 2017 and translation thereof.
Office Action issued from The Canadian Intellectual Property Office on Mar. 25, 2019 in conection with the Canadian related application No. 3,006,919.

(56) References Cited

OTHER PUBLICATIONS

Office Action isssued from the USPTO on Dec. 8, 2022 in connection with the US related U.S. Appl. No. 17/077,436 and including the PTO/892 Form.
EPO; Extended European Serach Report of Application 10854221.8; Sep. 14, 2015, Johann Rochus.

* cited by examiner

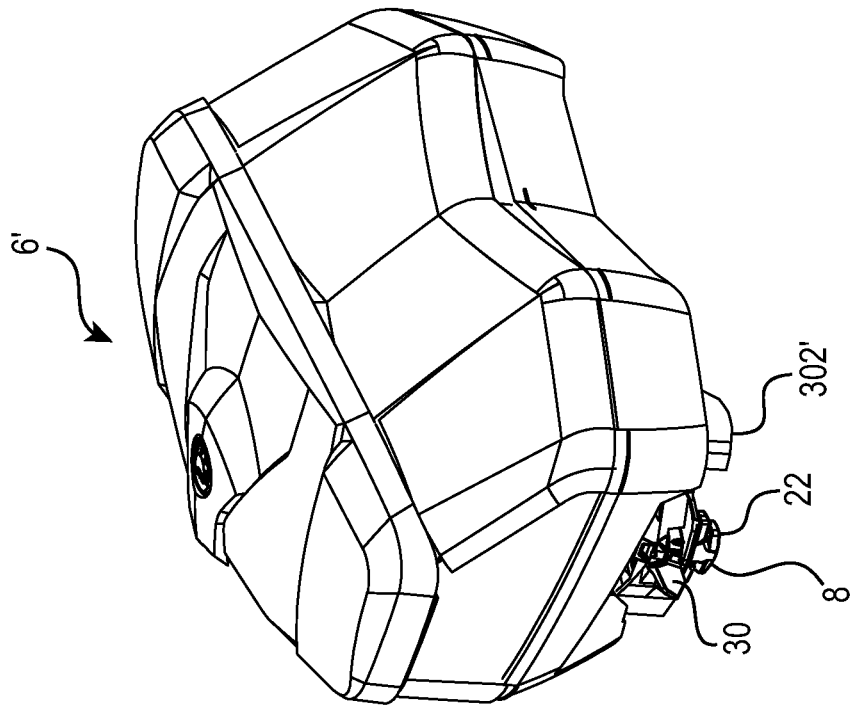
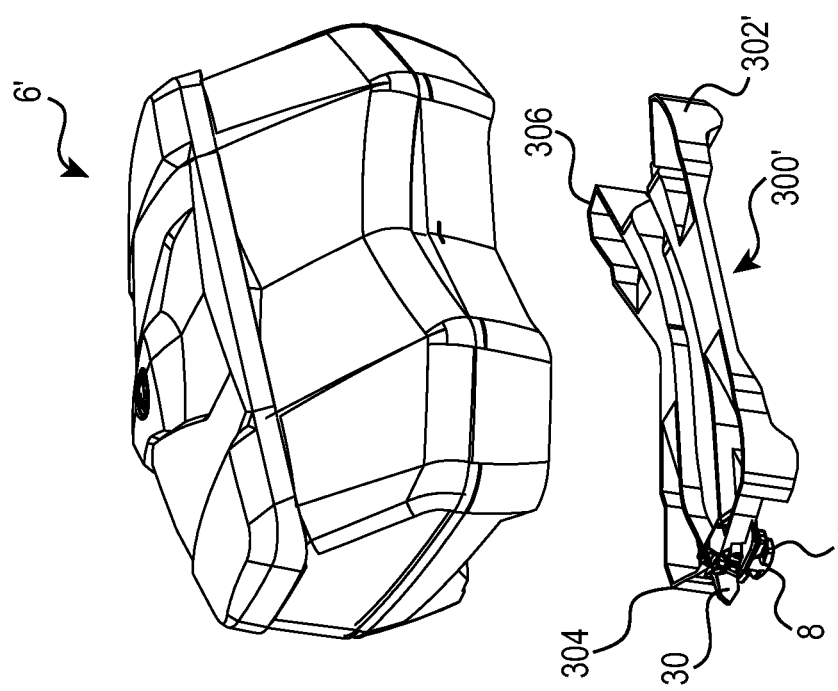

SYSTEM FOR SECURING AN ACCESSORY TO A VEHICLE

CROSS-REFERENCE

The present application is a continuation of U.S. patent application Ser. No. 17/718,003, filed on Apr. 11, 2022, which is a continuation of U.S. patent application Ser. No. 17/077,436, filed on Oct. 22, 2020, which is a division of U.S. patent application Ser. No. 15/662,877, filed on Jul. 28, 2017 (now issued as U.S. Pat. No. 10,850,806), which is a division of U.S. patent application Ser. No. 14/389,476 (now issued as U.S. Pat. No. 9,751,592), filed on Sep. 30, 2014, which is a 371 of International Patent Application No. PCT/US2013/034391, filed on Mar. 28, 2013. International Patent Application No. PCT/US2013/034391 claims priority to U.S. Provisional Patent Application No. 61/618,505 filed on Mar. 30, 2012. The entirety of each of the above-listed applications is incorporated herein by reference.

FIELD OF THE INVENTION

The present invention relates to systems for securing an accessory to a vehicle.

BACKGROUND

Vehicles such as snowmobiles often carry miscellaneous accessories for personal items, fuel, equipment, and the like, in addition to passengers. The vehicles may be provided with sections or racks and the like to carry cargo. Other sections or arrangements may be also provided to add passengers. The cargo items are often secured to parts of the vehicles by ropes, cords, tie-downs and the like. This is however, not a convenient method for transporting objects on a vehicle. Jerks and bumps experienced during travel can sometimes result in objects shifting within the spaces in which they were placed, or loosening from the grips of the tying cords. It is not always easy to find a space having the ideal shape or size for carrying particular objects, or to find a hook or structure for securing an object to in the desired location.

Additionally, some accessories such as seats, armrests and the like are generally permanently attached to the snowmobile or other vehicle, and do not allow them to be easily interchanged or substituted. It would be useful to have these accessories be detachable or adjustable, for instance, so that the vehicle can be easily customized for different drivers and passengers.

Therefore, there is a need for a system for securing an accessory to a vehicle that address at least in part the above drawbacks.

SUMMARY

It is an object of the present invention to ameliorate at least some of the inconveniences present in the prior art.

In a first aspect, a system for transporting items on a base of a vehicle is provided. The base can be a rack. The rack has one or more aperture(s) sized to receive corresponding anchor(s). The anchors are designed to be secured to the base and also, when desired to secure one or more accessories to the base. The accessories are items or containers that have features designed for cooperating with the anchor and the base. The anchors can also have features used for preventing an item (i.e. cargo item) from moving from the base, and can also have features for connecting to a connector for further securing the item to the base. Owing to the versatile use of the anchor(s) and the rack, cargo items can be transported, either directly onto the base using the anchors as restraining or hooking points for example, or inside accessories that are secured to the base by the anchor(s) (directly or indirectly).

Thus, as broadly embodied herein, an anchor and an attachment base assembly comprises an anchor and an attachment base assembly comprising a base having at least one base aperture, and an anchor selectively operatively connected to the base. The anchor is selectively inserted at least partially into the at least one base aperture and optionally into an aperture of a first accessory. The anchor has an anchor base connecting part. At least a portion of the anchor base connecting part is movable relative to a remainder of the anchor between a locked position where the anchor is secured to the base and an unlocked position where the anchor is free from the base. The anchor base connecting part is selectively connected at least partially to a brim of the at least one base aperture for bracing at least partially the base. A first accessory connecting part is operatively connected to the anchor base connecting part. The first accessory connecting part is adapted to selectively connect at least partially to a brim of the aperture of the first accessory for bracing at least partially the first accessory to the base when the anchor is in the locked position.

It is also an aspect to provide a vehicle comprising a frame and a seat connected to the frame. A propulsion system is connected to the frame. A driving system is operatively connected to the propulsion system. A base is connected to the frame. The base has at least one base aperture. At least one of a first accessory and a second accessory is connected to the base. At least one anchor selectively is secured to the base for connecting the at least one of a first accessory and a second accessory to the base. The at least one anchor has an anchor base connecting part. A first accessory connecting part is operatively connected to the anchor base connecting part, and at least one second accessory connecting part. When the least one anchor is secured to the base the anchor base connecting part braces at least partially the brim of the at least one base aperture. When the first accessory is secured to the base, the anchor further braces at least partially a brim of an aperture of the first accessory to the base. When the second accessory is connected to the base, the at least one second accessory connecting part connects the second accessory to the base.

The term 'brim' refers to external surface(s) adjacent to an edge of an aperture.

The term 'rim' refers to internal surface(s) of an aperture adjacent to the edge(s) of the aperture.

The term 'contour' refers to a shape of an element formed by its sides and edges. It should be understood that the shape of an element is independent of its size. Elements may have the same shape but have different size (for example two round holes of different diameters).

The term 'flange' refers to an outwardly extending portion. Steps and lips are two examples of flanges.

The term 'recess' refers to an inwardly extending portion. For example, two adjacent flanges form a recess therebetween. In another example, an inwardly extending portion of an otherwise flat member forms a recess.

According to another aspect, there is provided an anchor for use with a rack connected to a vehicle, including an anchor case, the anchor case having a rack connecting part for making contact with the rack and an accessory connecting part for making contact with an accessory; at least one cam rotatably connected to the anchor below the rack connecting part, the at least one cam being rotatable about an axis between a locked position and an unlocked position to selectively secure the anchor and the accessory to the rack; and a lever operatively connected to the at least one cam, the lever being rotatable by a user in order to cause the at least one cam to rotate between the locked position and the unlocked position, the rack connecting part being positioned between the at least one cam and the accessory connecting part along the axis.

In some embodiments, the lever rotates away from at least a portion of the accessory connecting part when rotating from the locked position toward the unlocked position.

In some embodiments, the accessory connecting part abuts and biases the accessory towards the rack when the lever is rotated from the unlocked position to the locked position.

In some embodiments, when the lever is placed in the locked position: the accessory connecting part secures the accessory, the accessory connecting part impeding the accessory from lifting and sliding with respect to the rack.

In some embodiments, the accessory connecting part and the rack connecting part are integrally formed with the anchor case.

In some embodiments, the anchor further includes a biasing mechanism biasing the at least one cam towards the anchor case.

In some embodiments, the anchor further includes a latch, the at least one cam extending from a first end of the latch; and the latch includes splines at a second end of the latch.

In some embodiments, the anchor further includes a stem passing through the latch, the anchor case and at least a portion of the lever, the stem including a first end and a second end; and a fastener installed on the first end of the stem; and the stem pivotally connects the latch and the lever to the anchor case; the first end of the stem is disposed nearer to the at least one cam; the biasing mechanism is disposed at the first end of the stem and adjacent the at least one cam; and the fastener impedes the biasing mechanism from being removed from the stem, the fastener compressing the biasing member biasing the cam towards the anchor case.

In some embodiments, the at least one cam comprises two cams extending in opposite directions from the latch.

In some embodiments, the latch, the splines and the at least one cam are integrally formed as a single-piece component.

In some embodiments, the lever has splines that are mated with the splines of the latch.

In some embodiments, the biasing mechanism comprises at least one of: a spring washer, a coil spring and a resilient member.

According to yet another aspect, there is provided an accessory rack including a frame having a first end and a second end opposite the first end; a tongue fastener at the first end; and an anchor according to at least some of the above embodiments, the anchor being integrated with the frame at the second end.

According to yet another aspect, there is provided a system for securing an accessory to a vehicle. The system includes a rack configured to be connected to the vehicle, the rack defining a rack aperture; and an anchor according to at least some of the above embodiments, the anchor being selectively secured to the rack and configured to brace the accessory against the rack, the anchor being selectively inserted into the rack aperture.

In some embodiments, the at least one cam comprises two cams extending in opposite directions from the latch.

In some embodiments, the latch has a first end and a second end; the at least one cam is closer to the second end than the first end; and the latch has splines at the first end to operatively connect the latch to the lever.

In some embodiments, the latch, the splines and the at least one cam of the anchor are integrally formed as a single-piece component.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle, in a straight ahead orientation (i.e. not steered left or right), and in an upright position. When referring to a component alone, terms related to spatial orientation should be taken with respect to the component itself. The explanations provided above regarding the above terms take precedence over explanations of these terms that may be found in any one of the documents incorporated herein by reference.

Embodiments of the present invention each have at least one of the above-mentioned objects and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 2A shows a perspective view taken from a front, left side; FIG. 2B shows a perspective view taken from a rear, right side; FIG. 2C shows a front elevation view; FIG. 2D shows a top plan view; and FIG. 2E shows a rear elevation view of the anchor fixture of FIG. 1;

FIG. 8A is a perspective view taken from a rear, left side of a bag and an accessory base according to a second embodiment;

FIG. 8B is a perspective view taken from a rear, left side of the bag and an accessory base of FIG. 8A shown in an assembled configuration;

FIG. 9A is a perspective view taken from a rear, right side thereof; FIG. 9B is a left side elevation view thereof and FIG. 9C is a top plan view thereof;

FIG. 14A is a perspective view taken from a top, rear side thereof; FIG. 14B is a left side elevation view thereof; FIG. 14C is a top plan view thereof; FIG. 14D is a rear elevation view thereof; FIG. 14E is a front elevation view; and FIG. 14F is a right side elevation view of the fixture on the left side of the snowmobile of FIG. 11;

DETAILED DESCRIPTION

Figure 1A:
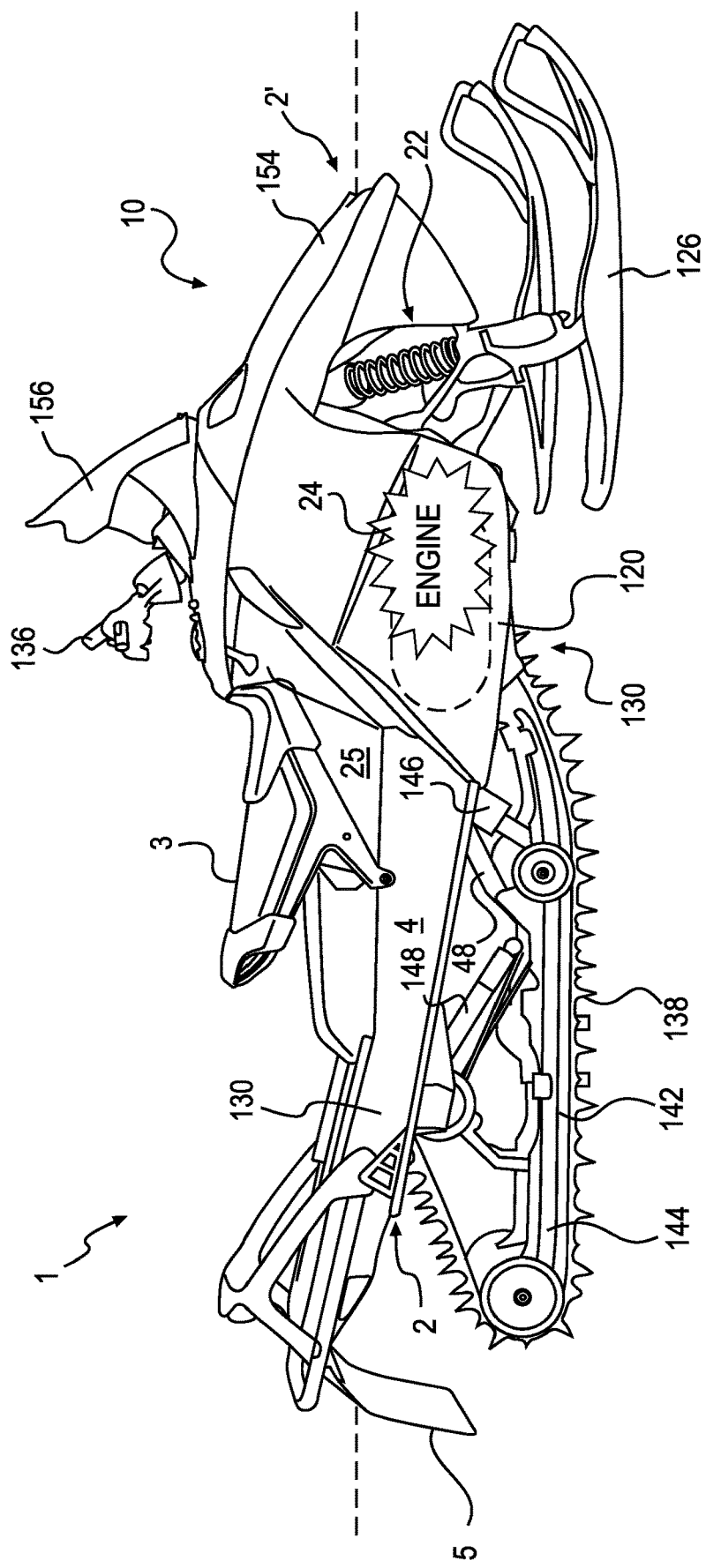
FIG. 1A is a right side elevation view of a snowmobile.

With reference to FIG. 1A, the middle and rear part of a snowmobile, shown generally as 1, will be described generally. It should be understood that the snowmobile 1 could be another type of snowmobile, and could have a construction other than the one described. The snowmobile 1 has a front end 2' and a rear end 2, which are defined with respect to the forward travel direction of the snowmobile 1.

The snowmobile 1 includes a chassis 130 which includes a tunnel 4. A ski 26 and steering assembly 136 is provided at the front end 2' of the snowmobile 1. The engine 124 and a belt transmission system 120 (shown schematically) disposed near the front end 3 are enclosed by fairings 154 which not only protect the engine 124 and the belt transmission system 120, but can also be decorated to make the snowmobile 1 more aesthetically pleasing.

In the rear section, an endless drive track 138 is disposed under the tunnel 4. The endless drive track 138 is operatively connected to the engine 124 through the belt transmission system 120. The endless drive track 138 is driven to run about a rear suspension assembly 148 for propulsion of the snowmobile 1. The endless drive track 138 is suspended for movement relative to the chassis 130, by a rear suspension assembly 148. The rear suspension assembly 148 includes a slide frame assembly 144 which primarily includes a pair of spaced apart slide rails 144 that engage the inner side of the ground-engaging portion of the endless drive track 138. A snowflap 5 is disposed at the rear end 2 of the snowmobile 1.

Figure 11A:
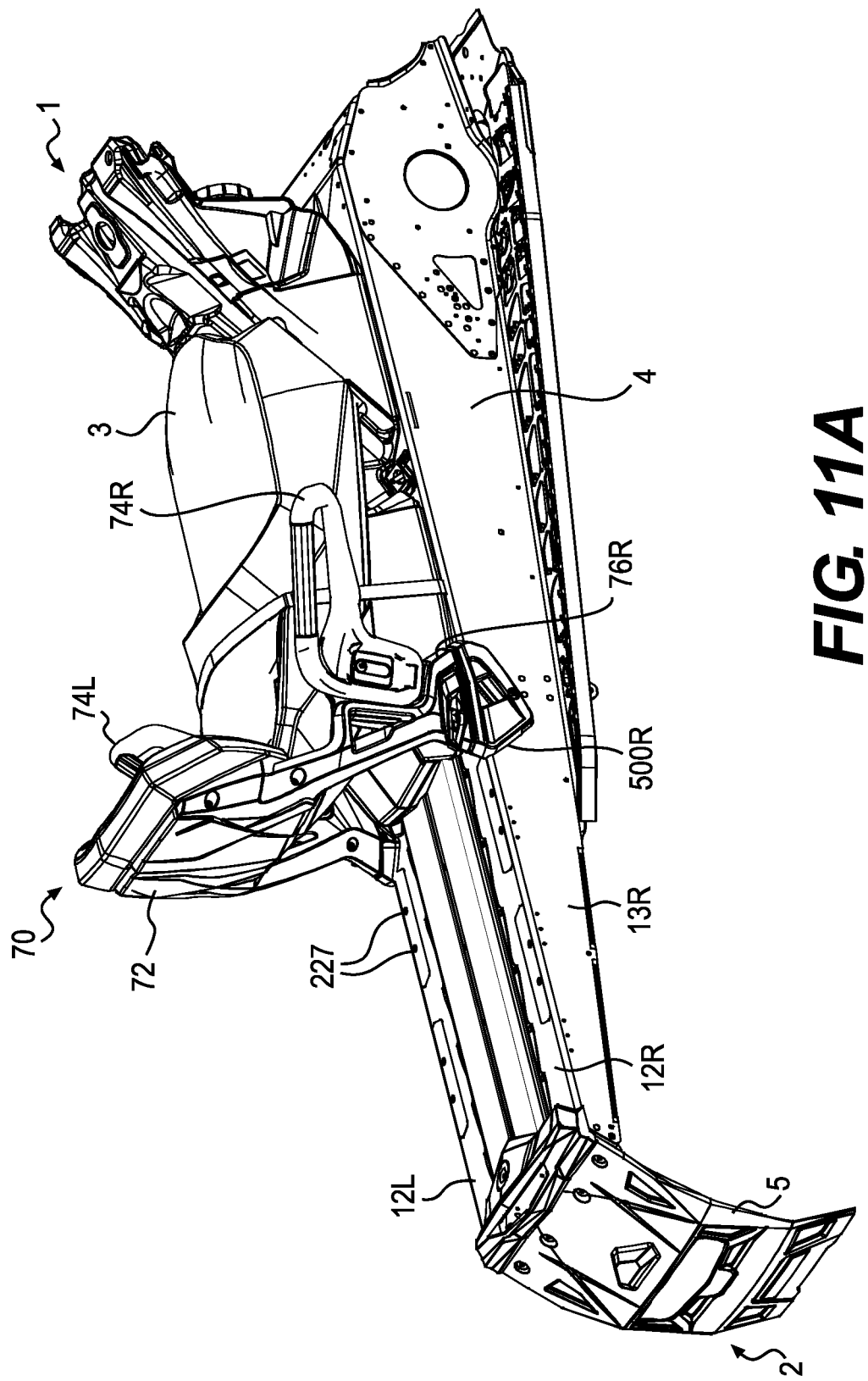
FIG. 11A is a perspective view taken from a rear, right side of portions of the snowmobile showing a backrest secured thereto by means of a fixture according to another embodiment.
Figure 11B:
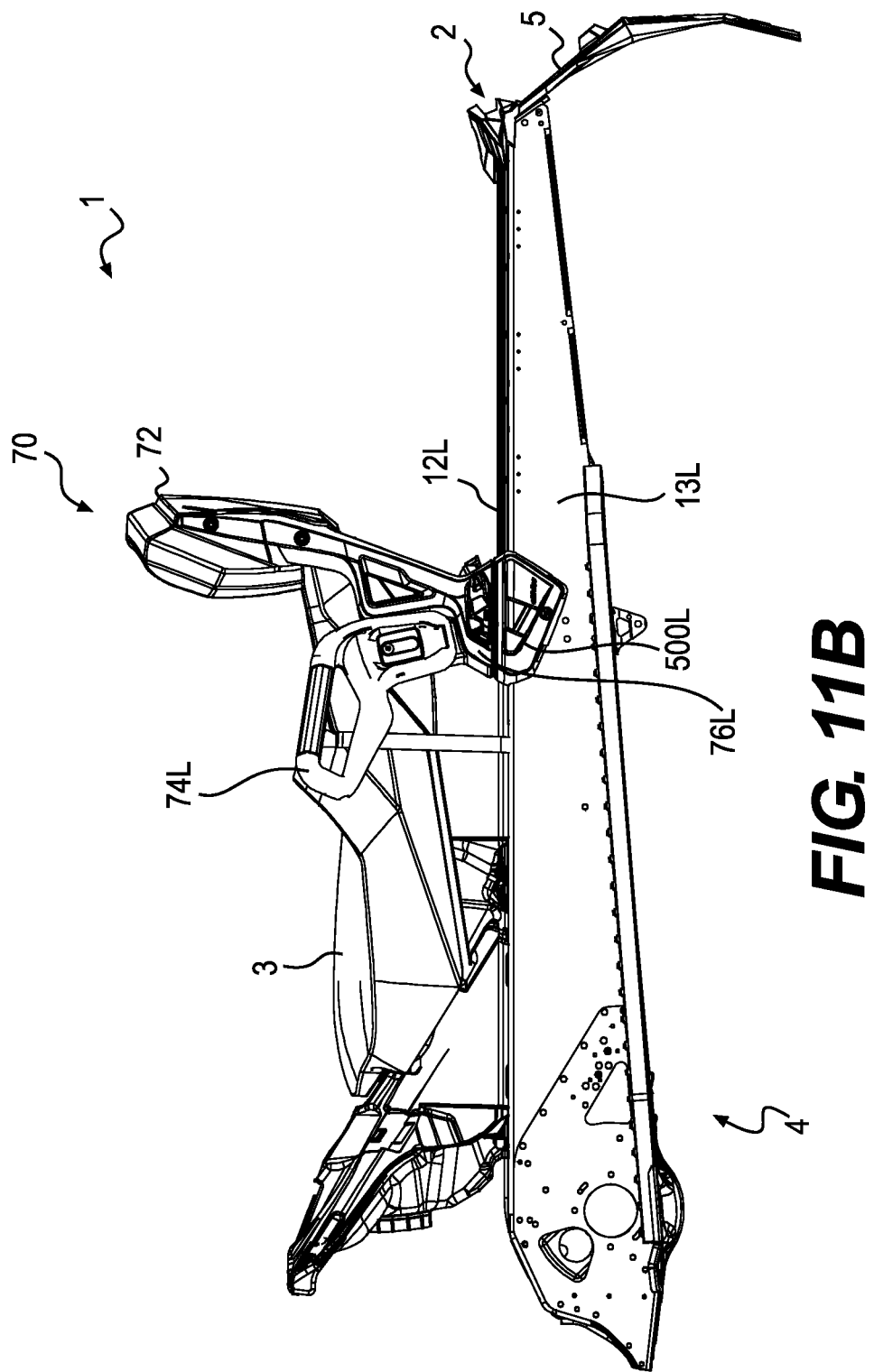
FIG. 11B is a left side elevation view of the snowmobile of FIG. 11A.
Figure 11C:
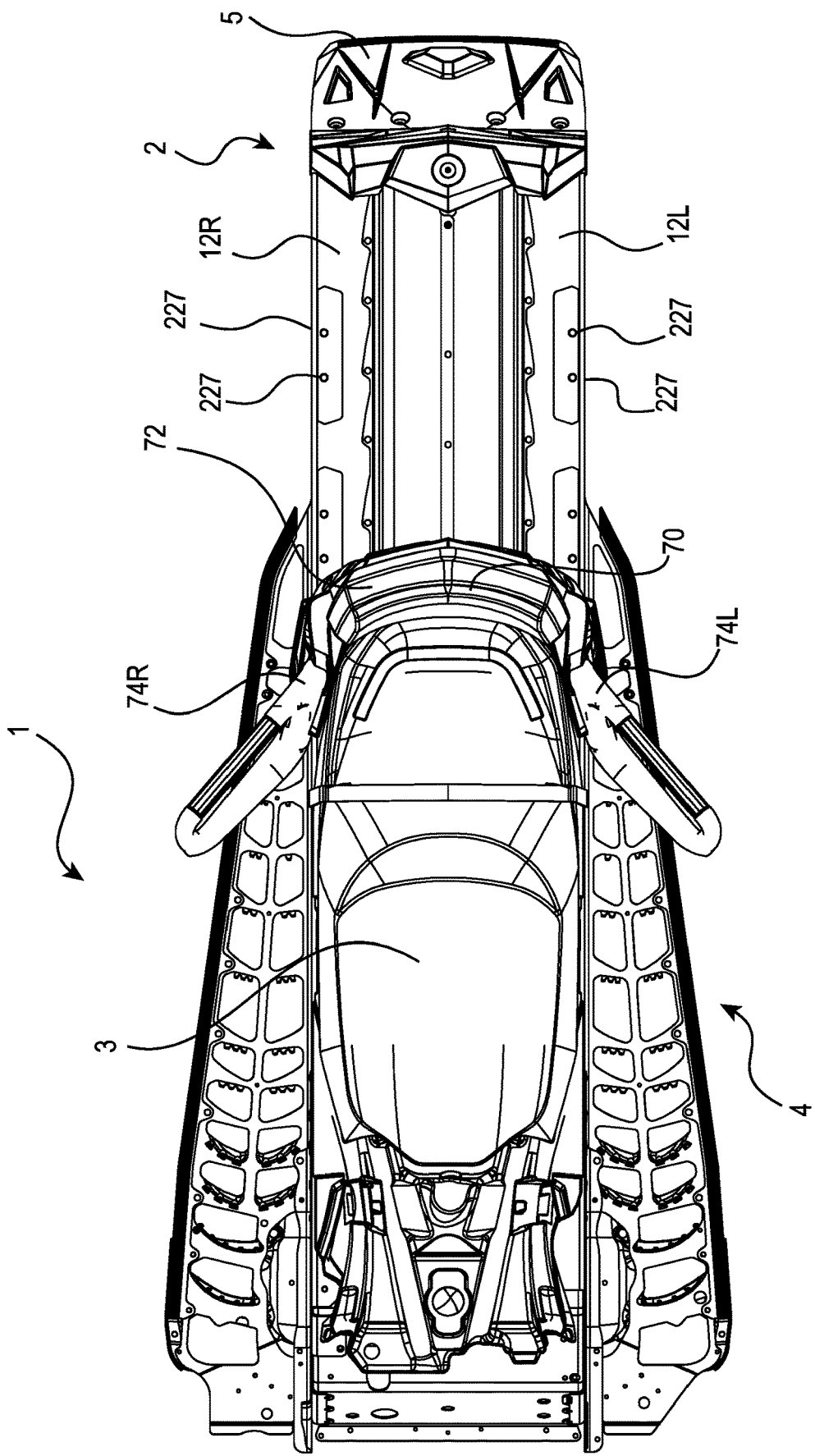
FIG. 11C is a top plan view of the snowmobile of FIG. 11A.
Figure 12:
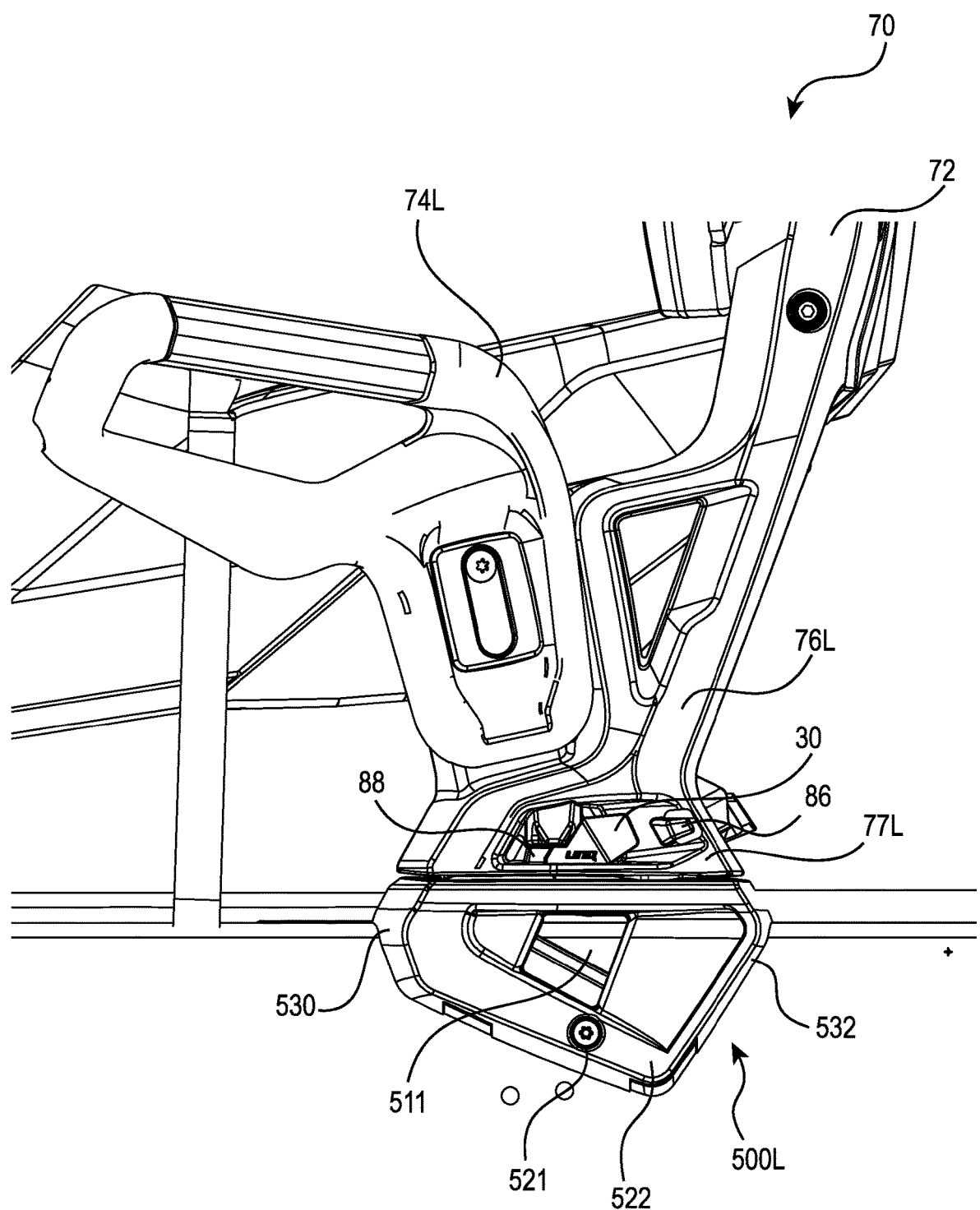
FIG. 12 is a close-up left side elevation view of the left armrest and the left fixture of FIG. 11A.

A snowmobile driver seat 3 is installed in the rear section of the snowmobile 1. A rear portion of the seat 3 may include a storage compartment, or may be used to accept a passenger seat 70 (FIG. 11A).

Figure 1B:
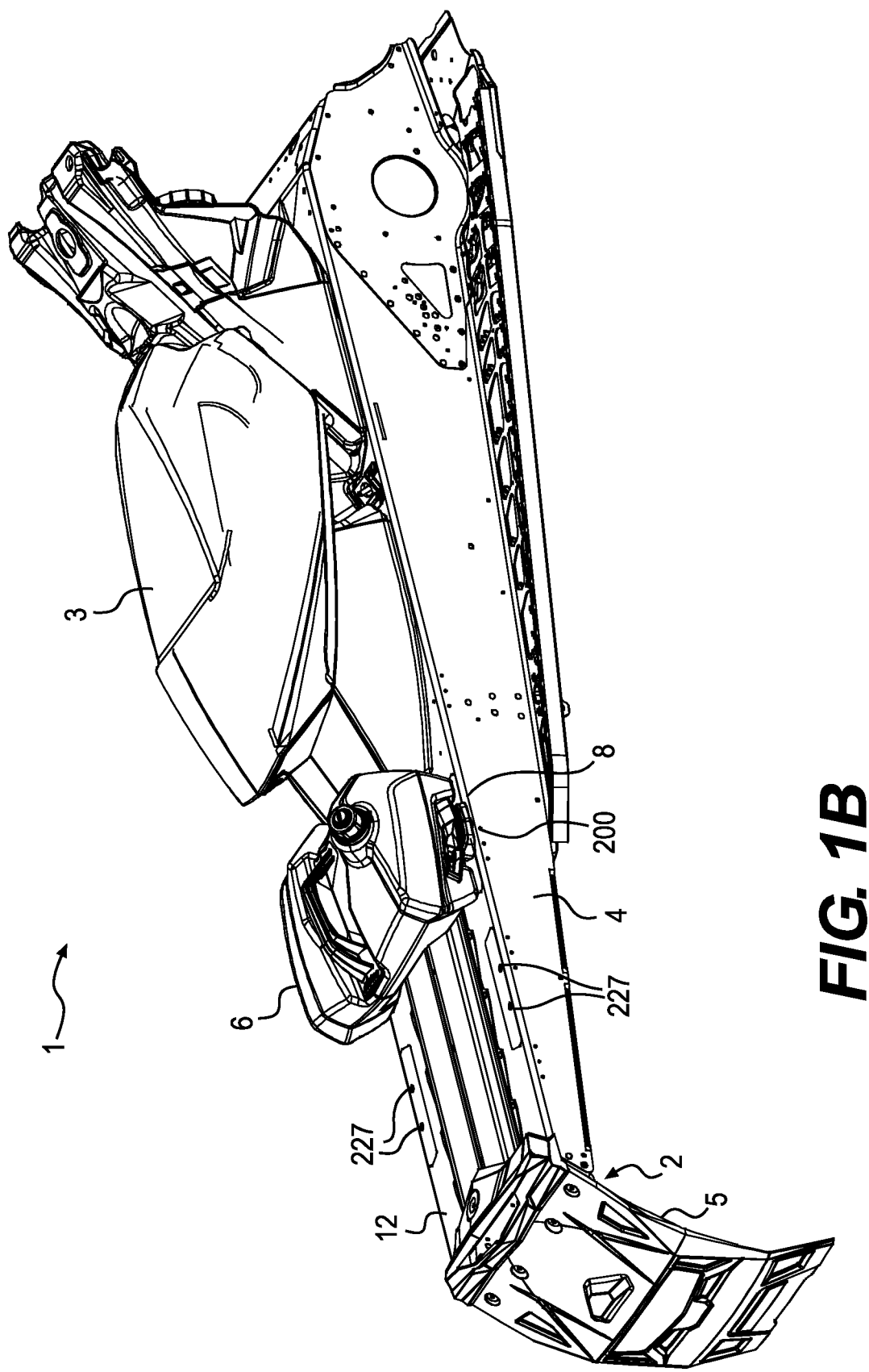
FIG. 1B is a perspective view taken from a rear, right side of portions of the snowmobile of FIG. 1 showing a jerry can secured to anchor fixtures on a tunnel of the snowmobile, one of the anchor fixtures having an anchor attached thereto.

With reference to FIG. 1B, an accessory 6 is anchored rearwards of the seat 3 on the upper surface 12 of the tunnel 4 by an anchor 8 secured to an anchor fixture 200 on the upper surface of the tunnel 4. The accessory 6 is a jerry can used for transporting fuel on longer excursions. The anchor 8 and the fixture 200 securing the accessory 6 to the snowmobile tunnel 4, and their operation will be discussed in greater detail below.

The snowmobile 1 has other features and components which would be readily recognized by one of ordinary skill in the art, further explanation and description of these components will not be provided herein.

Figure 1C:
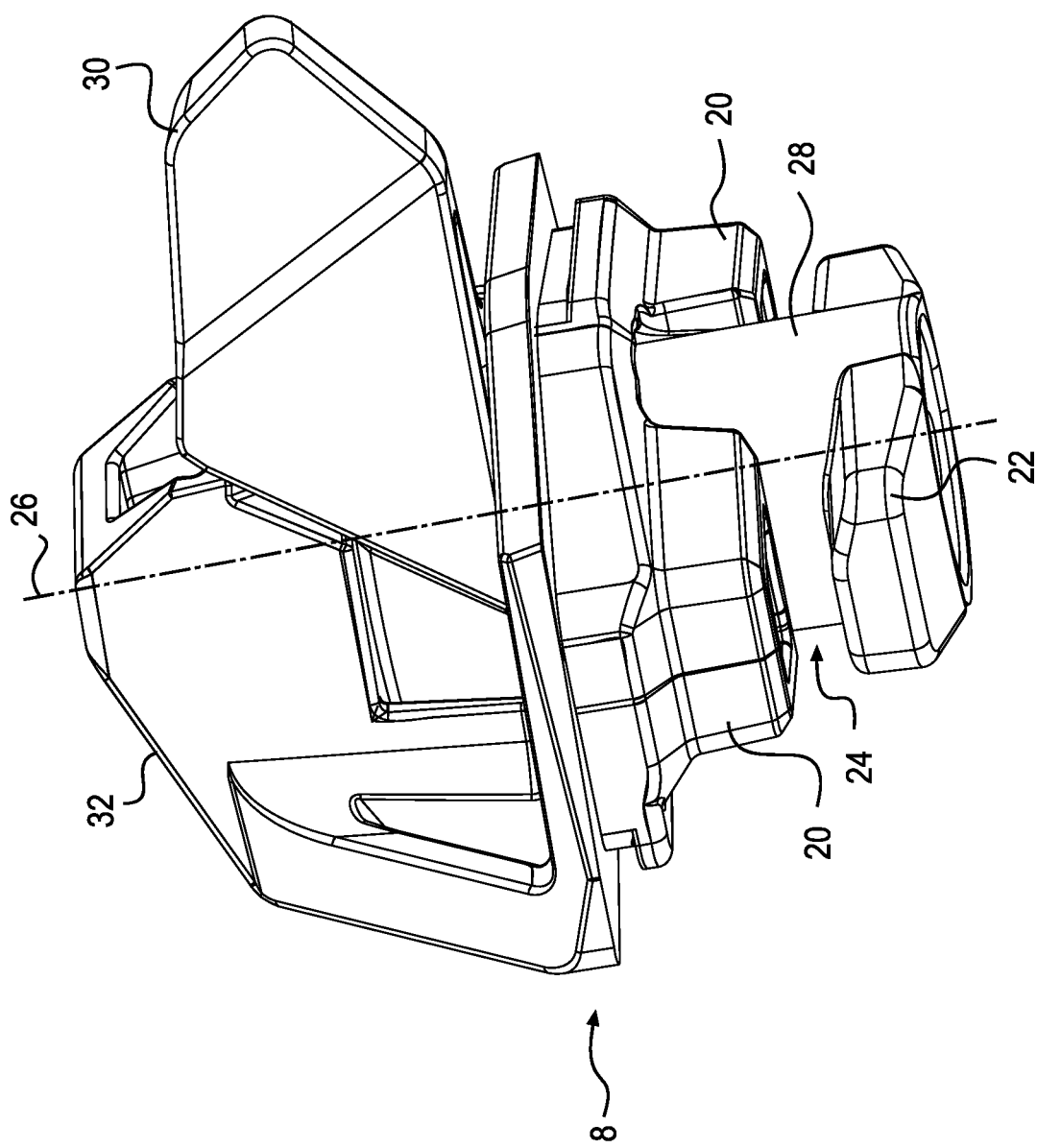
FIG. 1C shows a perspective view taken from a bottom, right side of the anchor of FIG. 1B in isolation.
Figure 2A:
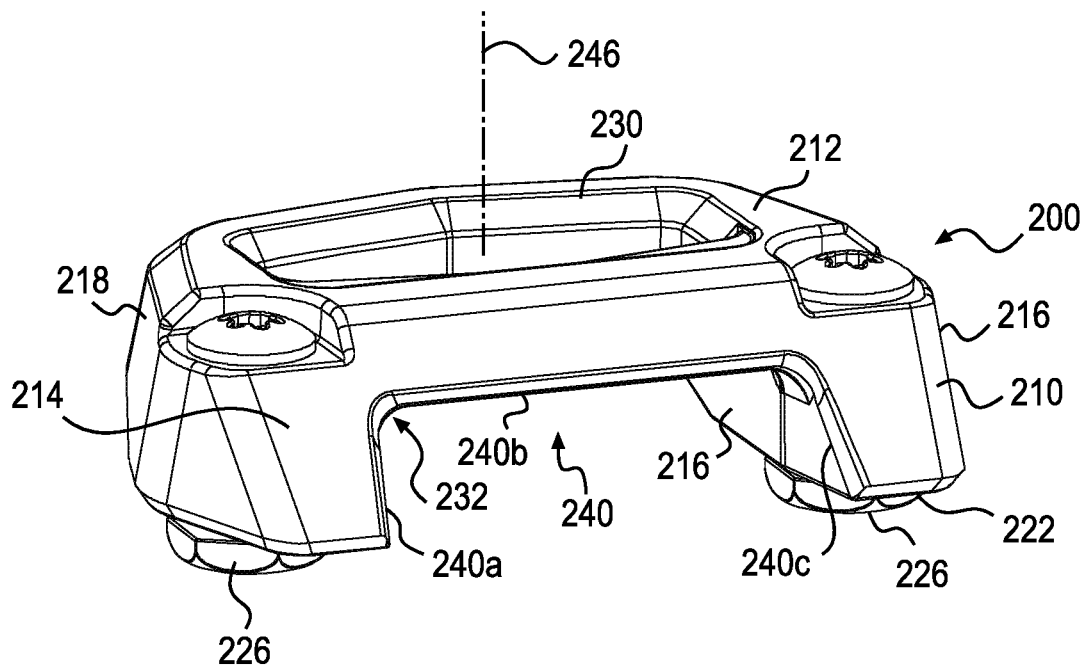
FIGS. 2A-2E are various close-up views of a right one of the anchor fixtures of FIG. 1B.
Figure 2B:
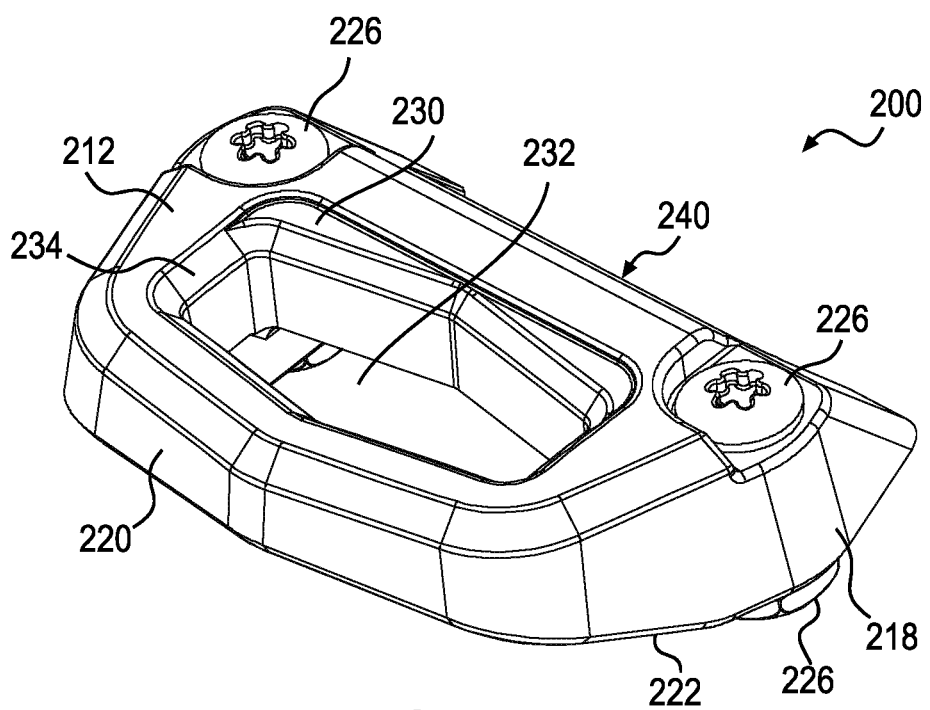
Figure 2C:
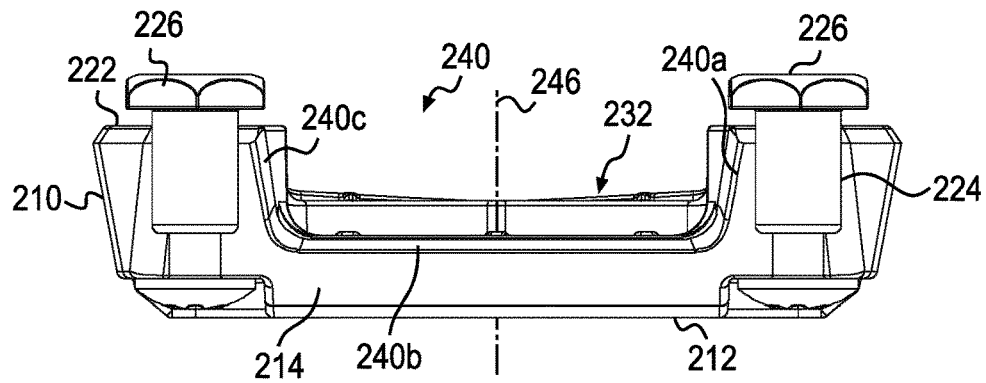
Figure 2D:
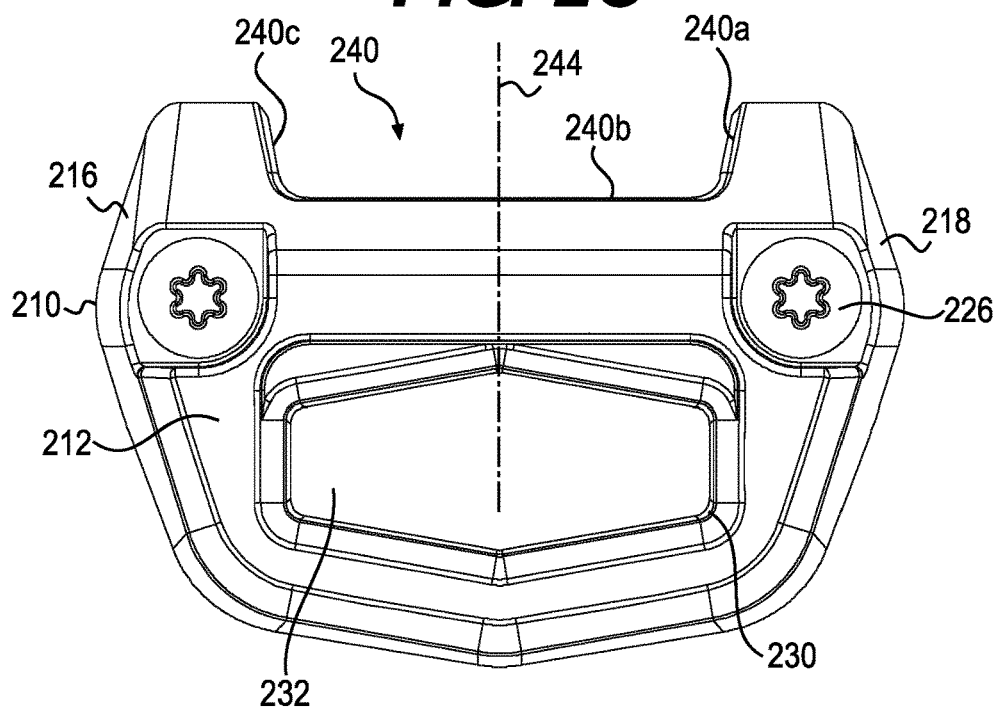
Figure 2E:
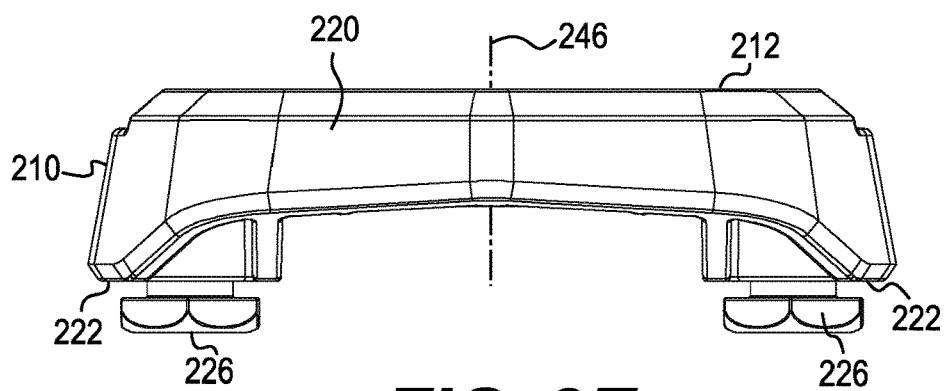

With reference to FIG. 1C, an exemplary anchor 8 includes an anchor base 20 and an anchor lock 22 extending from the anchor base 20. The anchor lock 22 and the anchor base 20 are separated by a space 24 wherein one or more surfaces can be held anchored together. The anchor base 20 and anchor lock 22 have an elongated shape. The anchor lock 22 is rotatable about an axis 26 perpendicular to the anchor base 20 between a locked position and an unlocked position that are separated by a quarter turn. In the unlocked position, the anchor lock 22 is disposed parallel to the anchor base 20, and in the locked position, the anchor lock 22 is disposed perpendicular to the anchor base 20. The anchor lock 22 extends from a stem 28 disposed along the axis 26. A lever 30 in a portion 32 of the anchor 8 that extends above the base 20 is rotatable about the axis 26 and is operatively connected to the anchor lock 22 to move the anchor lock 22 between the locked and unlocked positions. The locked and unlocked positions of the anchor 8 correspond to the anchor lock 22 being rotated by 90 degrees relative to the anchor base 20, and to the lever 30 being correspondingly turned by 90 degrees. It is contemplated that the anchor lock 22 could be turned by more or less than 90 degrees to engage an aperture 230 (FIG. 2A) in the fixture 200. It is also contemplated that the lever 30 could be turned by a different angle than the anchor base 20 in order to move the anchor 8 between locked and unlocked positions. International Patent Publication No. WO 2012/002959 A1, published on 5 Jan. 2012, the entirety of which is incorporated herein by reference, provides additional details regarding anchors similar in construction to the anchor 8. For instance, an alternative embodiment of the anchor 8, an anchor 400, will be described in greater detail below.

With reference to FIGS. 2A through 2E, an anchor fixture 200, has a fixture body 210 with top 212, front 214, left side 216, right side 218 and rear 220 portions, each portion having an interior and an exterior surface. The fixture body 210 also has a base 222. An anchor aperture 230, designed for an anchor 8 to be inserted into, is defined through the top portion 212 of the anchor fixture 200. The anchor aperture 230 leads downwards through the top portion 212 to an anchor chamber 232. The anchor chamber 232, below the anchor aperture 230, extends outwards towards the front surface 214. A fastener aperture 240, designed for the insertion of a tongue fastener 310 (FIG. 3) is defined in the front surface 214 A pair of fasteners 226 inserted through a pair of fastener holes 224 in the fixture body 210 are used to secure the fixture 200 into fastener holes 227 defined in a vehicle surface.

The central axis 244 of the fastener aperture 240 (axis normal to the fastener aperture 240) is perpendicular to the central axis 246 of the anchor aperture 230 (axis perpendicular to the anchor aperture 230) and parallel to the base 222. The fastener aperture central axis 244 generally defines an acute angle with the anchor fixture base 222. It is contemplated that the central axes 244, 246 could be disposed at other angles to each other and to the anchor fixture base 222.

The elongated anchor lock 22 of an anchor 8 is inserted into the anchor chamber 232 through the anchor aperture 230 of top portion 212. The anchor lock 22 selectively engages the interior surface of the top portion 212 of the anchor chamber 232 when rotated between the unlocked position and the locked position. The anchor aperture 230 is elongated to allow insertion of the elongated anchor lock 22 into the anchor chamber 232, and the anchor chamber 232 extends outwards from the anchor aperture 230 to allow rotation of the elongated anchor lock 22 within the anchor chamber 232.

The anchor aperture 230 is in the shape of an irregular hexagon. The anchor aperture 230 is also contemplated to have other shapes such as circular, elliptical, polygonal and the like, depending on the anchor shape and anchor mechanism contemplated for use with the anchor fixture. For anchors 8 of the type shown in FIGS. 1C, the anchor aperture 230 can be any elongated shape such as elliptical, rectangular or an irregular polygon. The anchor aperture 230 has a chamfered rim 234, however, it is contemplated that the rim 234 could be unchamfered.

The anchor chamber 232 leading from the anchor aperture 230 is bounded partly by the interior surfaces of the anchor fixture 210, however, it is contemplated that the anchor chamber 232 could have more or fewer boundary surfaces than as shown, in part based on the anchor shape and selective engagement mechanism. The fastener aperture 240 in the front surface is generally rectangular and defined by three edges 240a, 240b, 240c of the front surface 214 of the fixture body 210. The fourth edge of the fastener aperture 240 would be defined by the surface on which the anchor fixture is attached. It is contemplated that the fastener aperture can be defined wholly by the fixture body 210 or by the fixture body 210 and any other surfaces that the anchor fixture 200 may be engaged with. For example, the fixture body 210 could define a portion of one or two sides of the fastener aperture 240.

Figure 3:
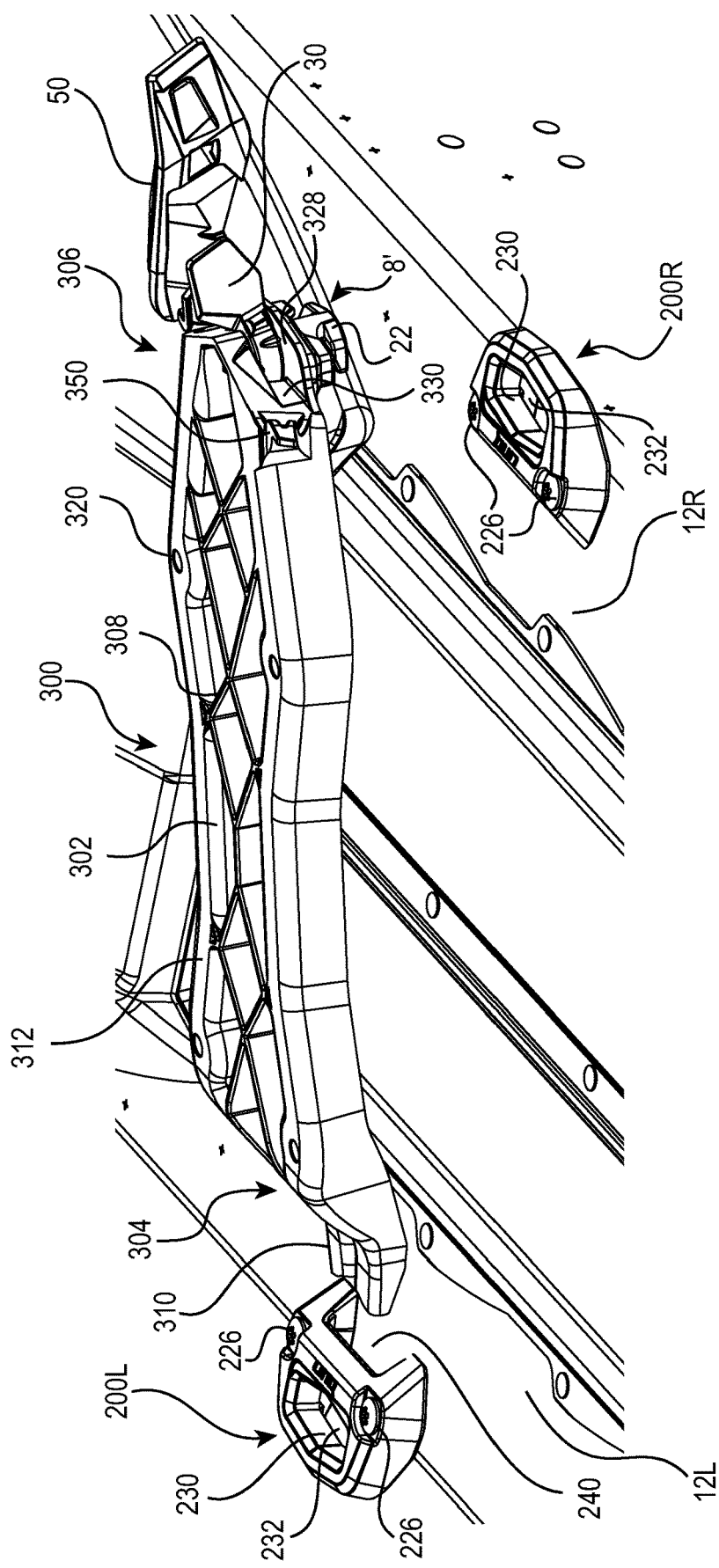
FIG. 3 is a perspective view taken from a rear, right side of a part of the snowmobile tunnel of FIG. 2A showing an accessory base with two different mounting elements for mounting to the anchor fixture of FIG. 2A.
Figure 4:
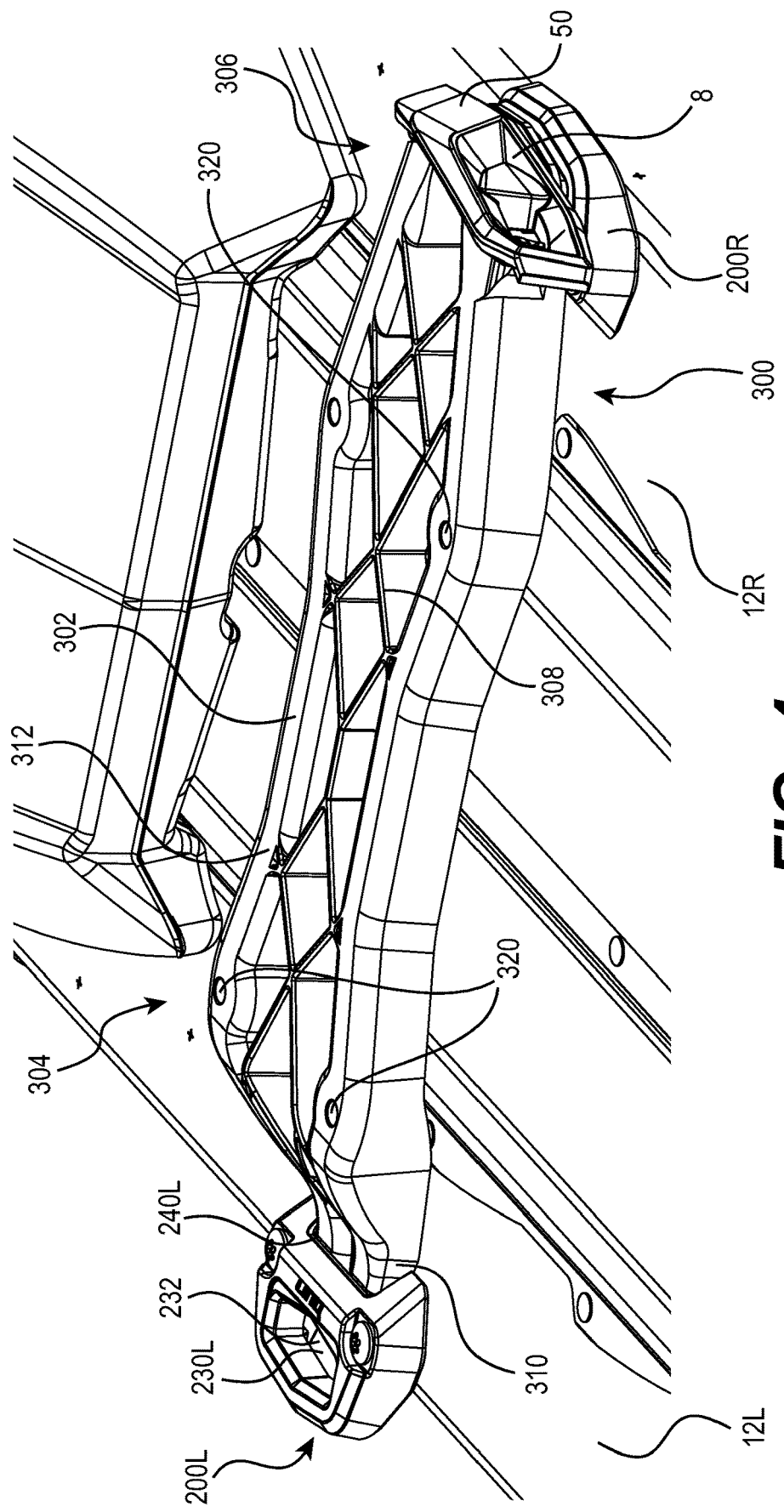
FIG. 4 is another perspective view taken from a rear, right side of a part of the snowmobile tunnel of FIG. 3 showing the accessory base mounted to the two anchor fixtures.

With reference to FIGS. 3A and 3B, the fastener aperture 240 is designed to be used with a tongue fastener 310 having a toe-in at the end that can be inserted into the fastener aperture 240 and retained within the anchor chamber 232 by the edges 240a,b,c of the fastener aperture 240 as seen in FIG. 4. The toe-in of the tongue fastener 310 widens laterally (in the direction parallel to the plane of the upper surface 312 of the frame 302) allowing it to be inserted into the fastener slot 240 until it fits tightly. Other structures are contemplated for the toe-in. It is also contemplated that additional restraining structures such as posts or hooks could be associated with the fastener aperture 240 to engage the tongue fastener 310, or portions of the tongue fastener 310. For example, the fastener aperture 240 could have a post extending into the anchor chamber 232 to engage and retain a tongue fastener 310 having two prongs at the end.

As will be discussed in further detail below, the anchor fixture 200 is designed to be used simultaneously by an anchor 8 and a tongue fastener 310. When both the anchor lock 22 and the toe-in 310 are simultaneously inserted in the anchor chamber 232, the anchor lock 22 is disposed above the toe-in part 311 of the tongue fastener 310. It is contemplated that the anchor chamber 232 could therefore have a different shape in the lower portion where the toe-in 310 is disposed than in the upper portion where the anchor lock 22 is disposed. For example, the anchor chamber 232 could have a trapezoidal shape in the lower portion adjacent to the base 22 and an elliptical shape in the upper portion adjacent to the anchor aperture 230. It is also contemplated that the anchor chamber 232 could be designed such that the anchor lock 22 and the toe-in 310 simultaneously inserted in the anchor chamber 232 are disposed on the right and left portions of the anchor chamber 232 or in the front and back portions of the anchor chamber 232.

Figure 9A:
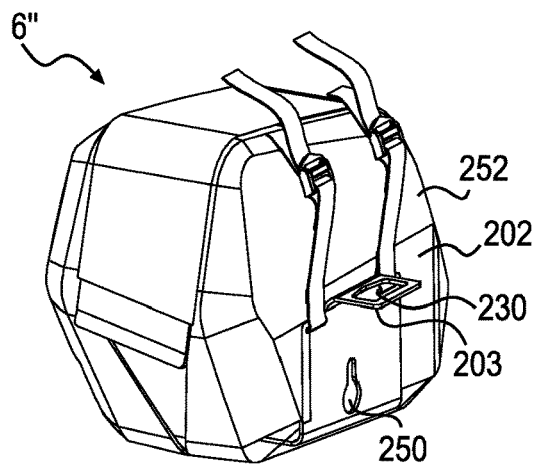
FIGS. 9A-9C are various views of a side bag having an anchor bracket.
Figure 9B:
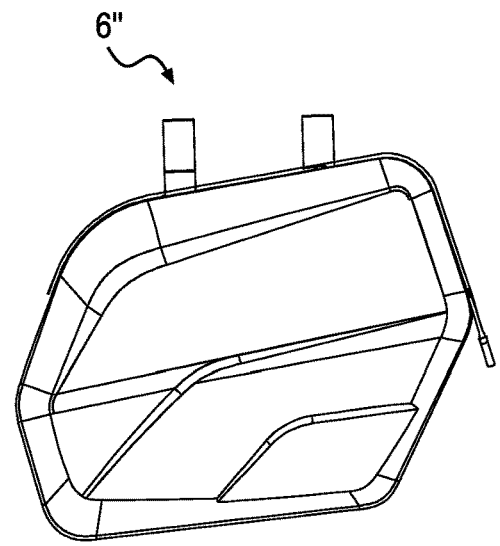
Figure 9C:
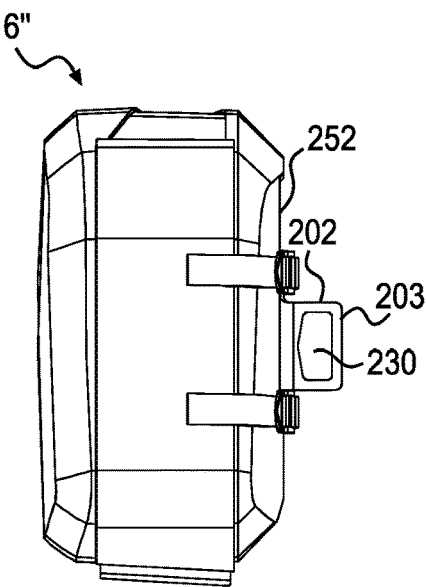

Referring now to FIGS. 3 to 9, the anchor fixture 200 can be used to attach different kinds of accessories 6, such as a jerry can 6, bag 6', sidebag 6", and the like, to a vehicle surface. The anchor fixture 200 could also be used to attach accessories having different attachment structures. The anchor aperture 230 could be used to attach accessories 6 having an anchor 8 integrated with the accessory 6. The anchor aperture 230 of the fixture 200 could also be used in conjunction with an anchor 8, to attach an accessory having an accessory anchor aperture 232 defined in the accessory body or in an anchor bracket 202 (FIG. 9) connected to the accessory body 6' (FIG. 9). The fastener aperture 240 could be used to attach an accessory 6 having a tongue fastener 310 attached to the accessory body 6. Different kinds of accessories and attachment systems thereof will be described below in further detail.

An accessory without any of the attachment structures mentioned above can be attached to a vehicle surface by attaching to the accessory an accessory base designed to be used with the anchor fixture 200. With reference to FIGS. 3 to 8, an accessory base shown generally as 300 comprises a frame 302, with a tongue fastener 310 at a first end 304 of the frame 302 and an anchor 8 integrated with the frame 302 at the opposite end 306. The frame 302 has several crisscrossing ribs 308 providing support to the accessory 6. The lever 30 of the anchor 8 disposed above the frame 302 while the anchor lock 22 connected to the lever 30 is disposed below the frame 302.

Figure 5A:
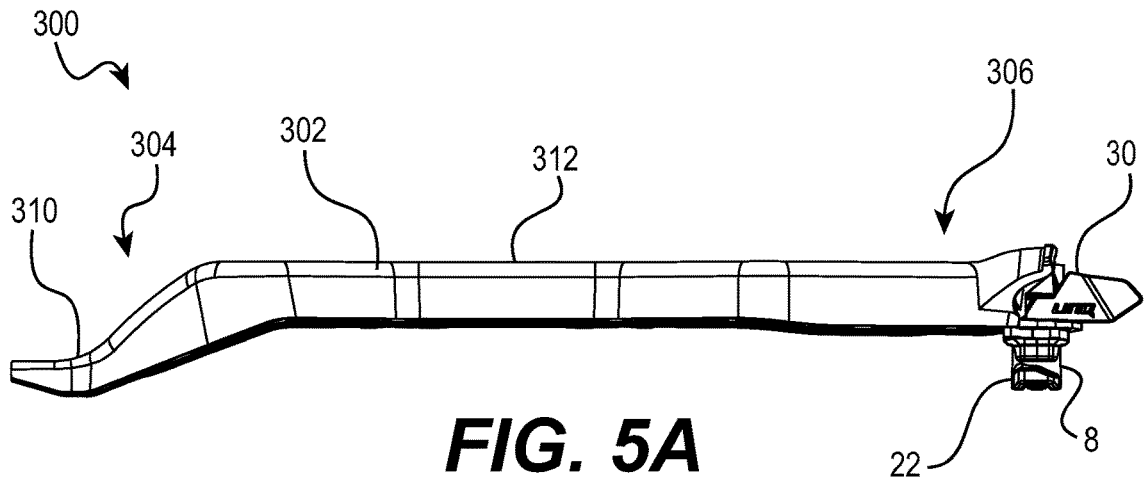
FIGS. 5A, 5B and 5C are respectively a rear elevation view, a bottom plan view and a front elevation view of the accessory base of FIG. 3, showing the anchor and a lever of the anchor, respectively in an unlocked and open position.
Figure 5B:
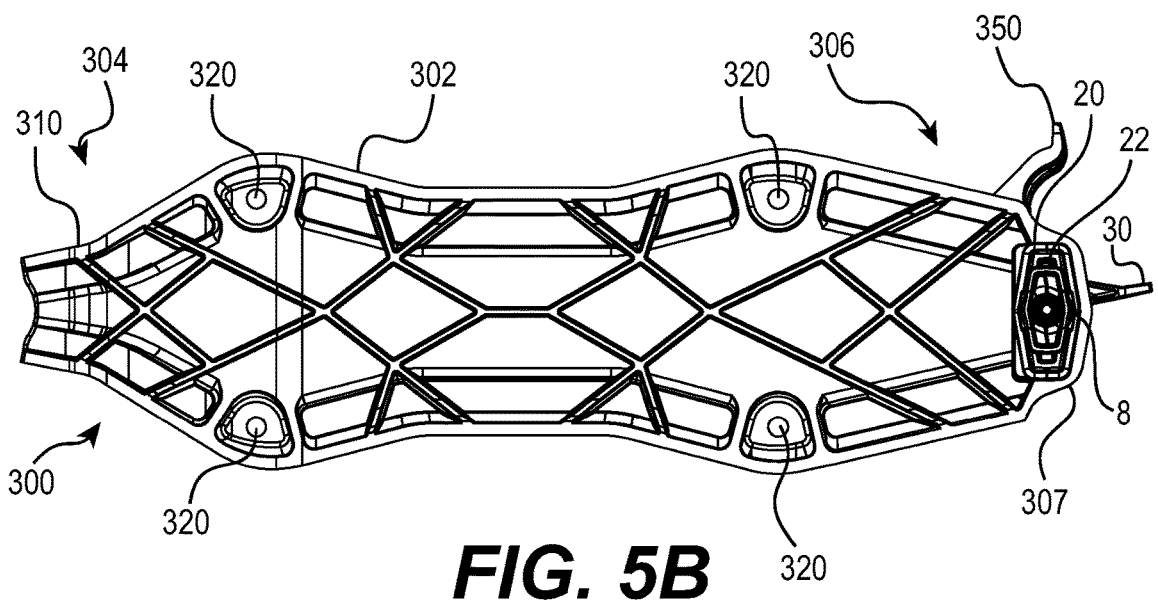
Figure 5C:
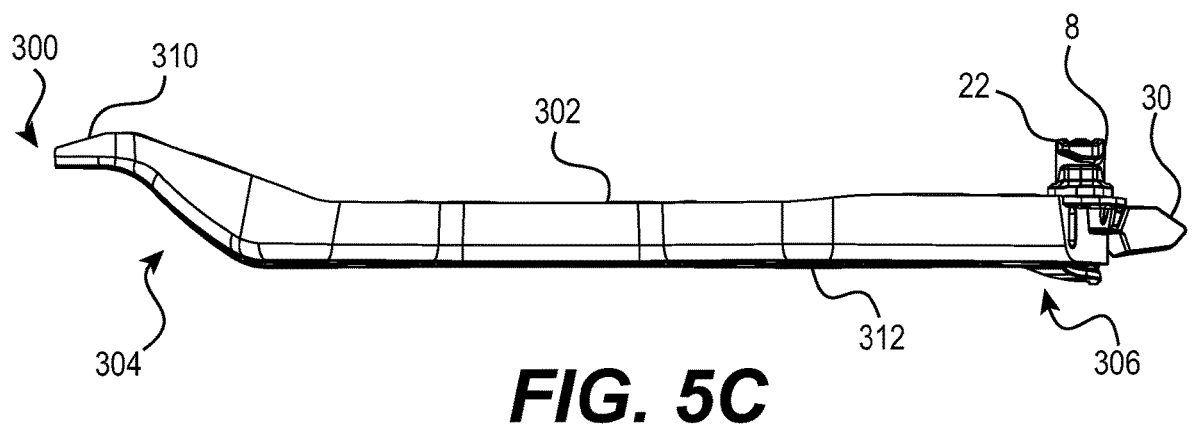
Figure 6A:
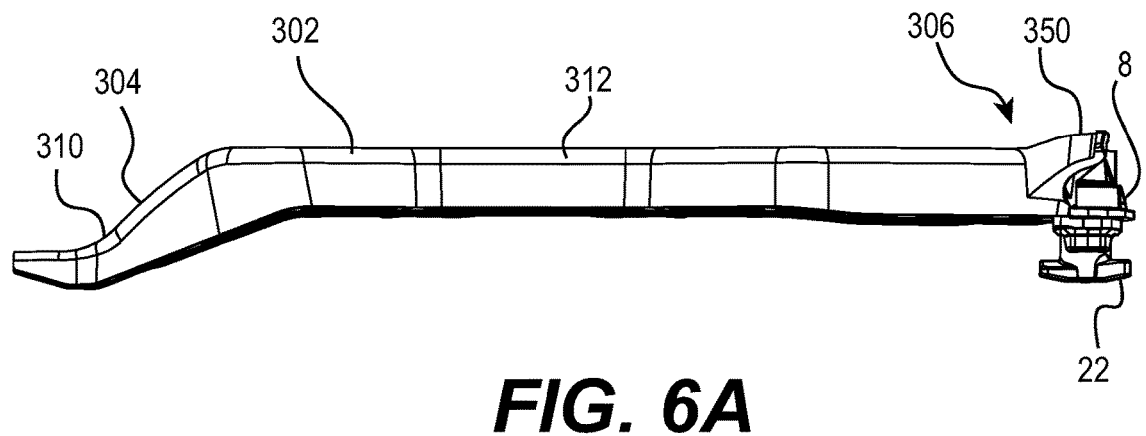
FIGS. 6A, 6B and 6C are respectively a rear elevation view, a bottom plan view and a front elevation view of the accessory base of FIG. 3, showing the anchor and the lever respectively in a locked position and a closed position.
Figure 6B:
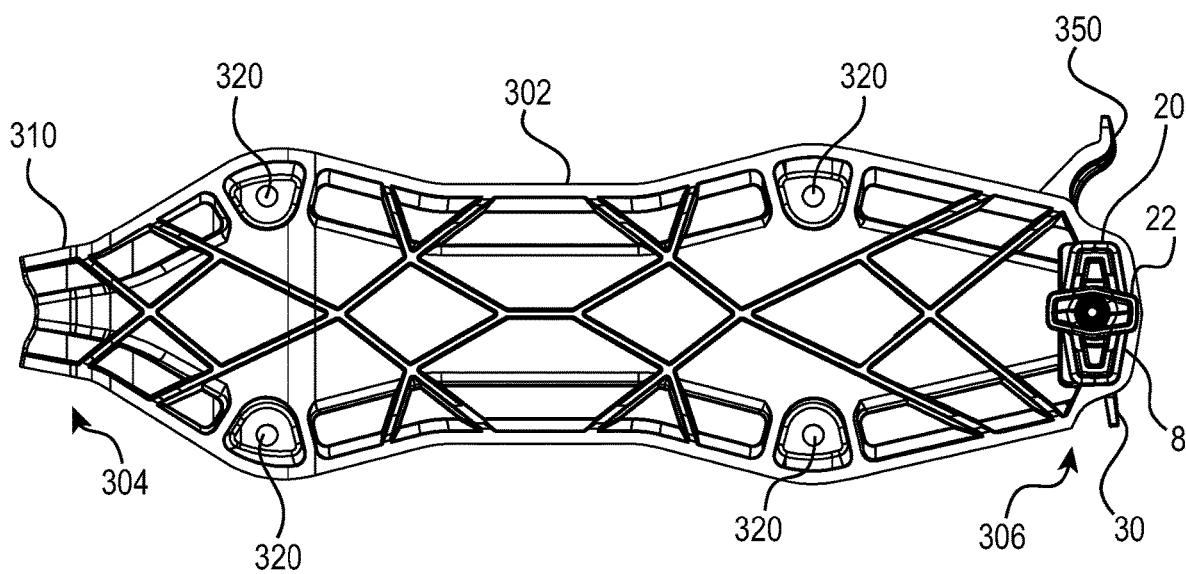
Figure 6C:
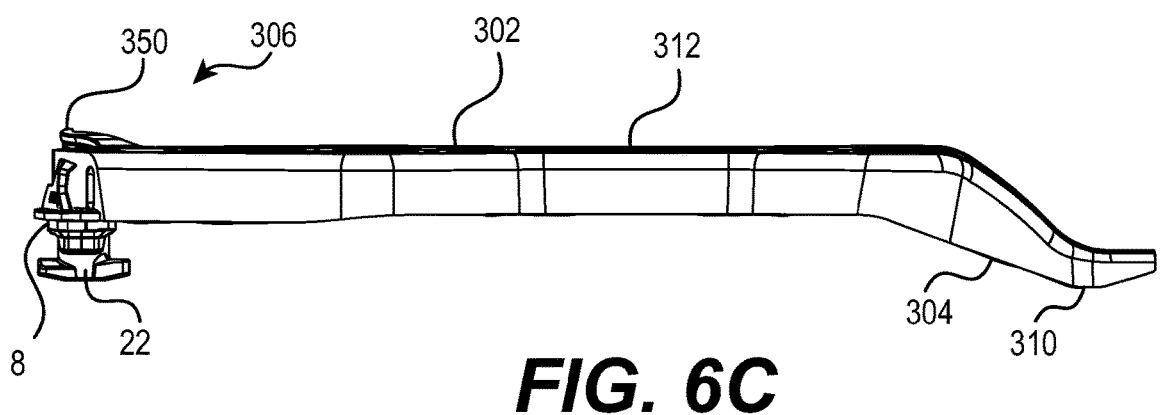

The lever 30 is used to rotate the anchor lock 22 between the locked position and unlocked position as mentioned above. In the unlocked position of the anchor 8, the open lever 30 extends outwards from the frame 302. The lever 30 is turned clockwise (when looking down from above the accessory base) in the groove 328 provided in the frame 302 for the lever 30 to lock the anchor 8. In the locked position of the anchor 8, the closed lever 30 is disposed adjacent to the frame 302 in the groove 328 and not extending outwards as in the unlocked position. Thus, when the anchor 8 is locked, the lever 30 is less likely to be accidentally pushed keeping the anchor 8 securely in lock position. In the unlocked position, the elongated anchor lock 22 is disposed parallel to the anchor base 20, and to the edge 307 of the frame 302 as can be seen in FIGS. 5A to 5C 5B. In the locked position, the anchor lock 22 is disposed perpendicular to the edge 307 of the accessory frame 302 as can be seen in FIGS. 6A to 6C.

Figure 7A:
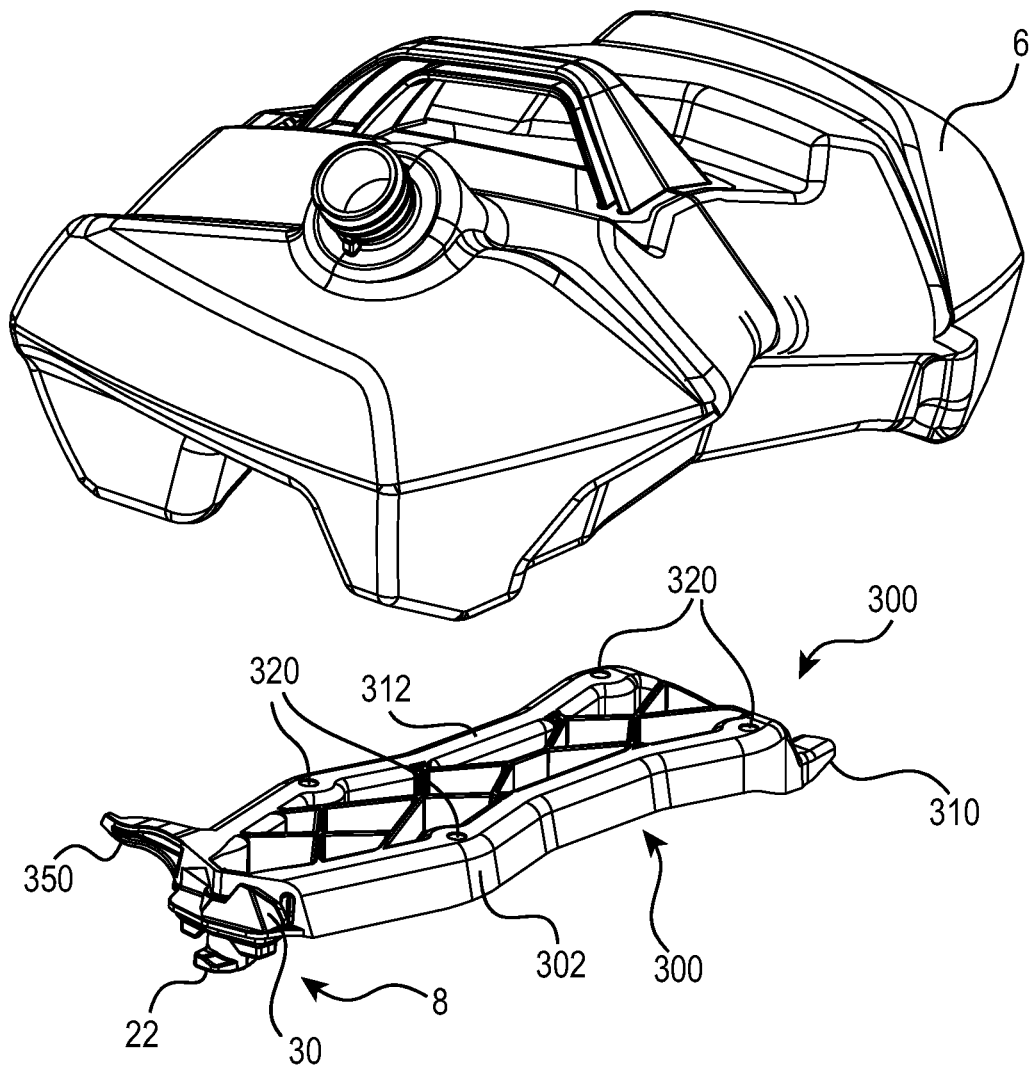
FIG. 7A is a perspective view taken from a front, right side of the jerry can of FIG. 1 and the accessory base of FIG. 3.
Figure 7B:
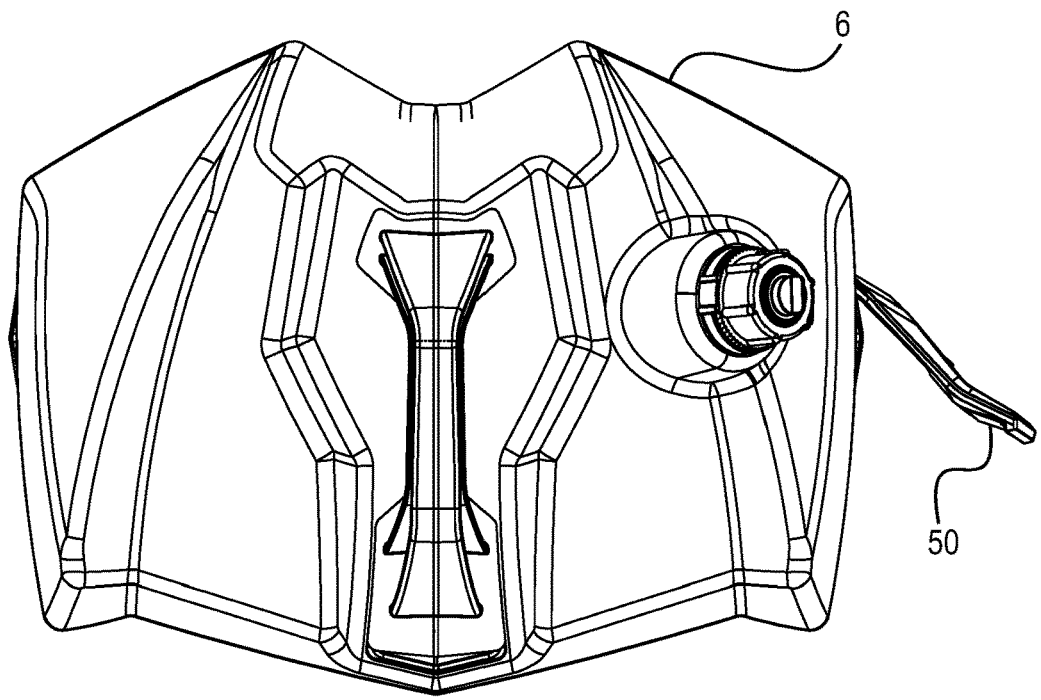
FIG. 7B is a top plan view of the jerry can of FIG. 7A mounted on the accessory base with the anchor in an unlocked position and the strap in an open position.
Figure 7C:
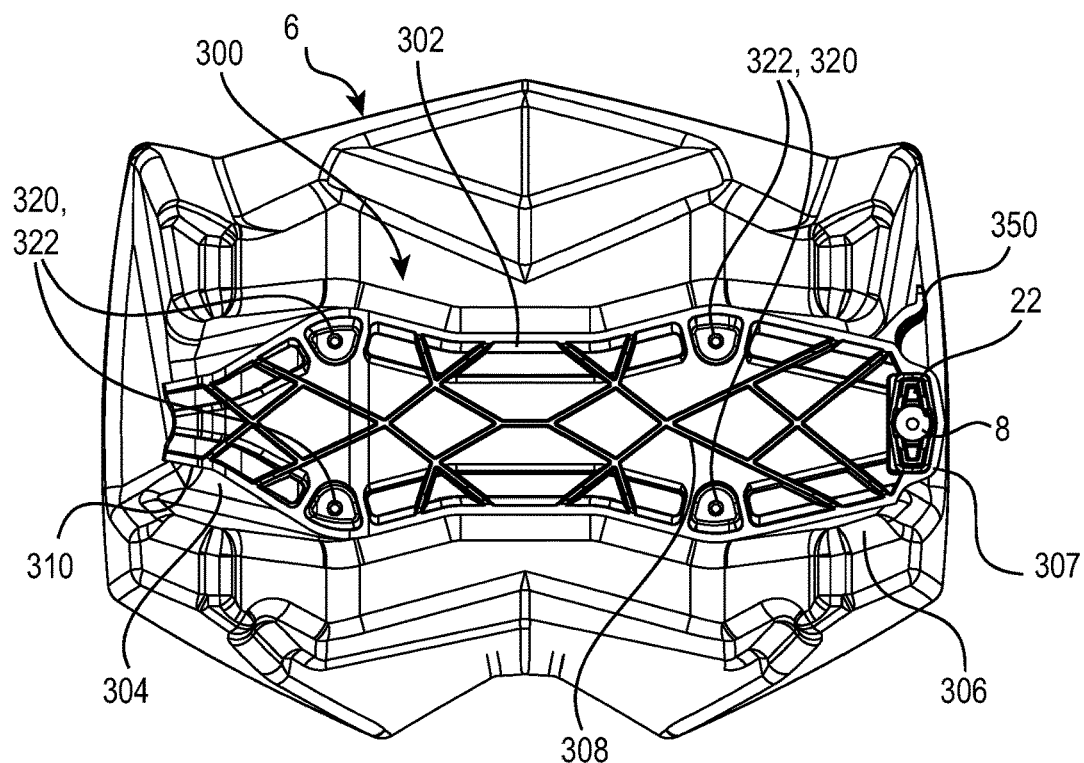
FIG. 7C is a bottom plan view of the jerry can of FIG. 7A mounted on the accessory base with the anchor in an unlocked position and the strap removed.

With reference to FIGS. 3, 4 and 7B, a strap 50 is provided on the frame 302 and attached thereto on one side of the anchor 8. The strap 50 can be extended over the closed lever 30 and hooked to a tab 350 on the frame 302 on the other side of the anchor 8. In FIG. 4, the anchor 8 is in a locked position, the lever 30 is closed, and the strap 50 is attached over the anchor 8. When the lever 8 is unlocked, the strap 50 is left hanging loosely from the frame 302, as seen in FIG. 3, and thereby providing a noticeable visual indication that the anchor 8 is unlocked. The strap 50 is made of rubber, however, it is contemplated that the strap 50 can be made of any flexible material. The strap 50 can also be detachable from the frame 302 so that it can be reused with other accessories 6 or other fixtures 200.

With reference to FIGS. 3 and 4, the accessory base 300 is mounted to two oppositely facing anchor fixtures 200L, 200R on the upper surfaces 12L, 12R on either side of the tunnel 4. The tongue fastener 310 is first inserted into the fastener aperture 240 of the fixture 200L. The tongue fastener 310 is retained in the anchor chamber 230 by the edges 240a,b,c, allowing the accessory base 300 to be braced against the anchor fixture 200L while it is installed into the anchor fixture 200R. The anchor 8 at the end 306 of the accessory base 300 is then inserted into the anchor aperture 230 of the anchor fixture 200R with the anchor 8 disposed in an unlocked position. Once the anchor 8 is inserted and the lever 30 is locked, the rubber strap 50 is extended over the lever 30 and attached to the hook 350 on the other side of the anchor 8 as seen in FIG. 4.

With reference to FIG. 7A to 8C, the accessory base 300 is attached to an accessory 6 by fasteners 322. An accessory 6 such as the jerry can 6 shown in FIGS. 1B and 7, and the bag 6' shown in FIG. 8, can be mounted on the upper surface 312 of the frame 302 and fastened to the frame 302 with fasteners 322 inserted through holes 320 provided in the frame 302. The accessory base 300 with the accessory 6, 6' mounted thereon can be installed in the fixtures 200 as shown in FIG. 1B.

When viewed from directly above the accessory 6, the accessory base 300 is hidden from view underneath the accessory 6. When the anchor 8 is in the unlocked position, the lever 28 and rubber strap 50 extend out from beneath the accessory 6 as can be seen in FIG. 7B. In some embodiments, the anchor 8 is attached to the accessory base 300 such that the anchor base 20 extends out from beneath the accessory 6, 6' in the unlocked position when viewed from above. It is also contemplated that an accessory base 300 could have larger lateral dimensions than the accessory 6 so that a greater portion of the base 20 is visible when viewing the accessory 6 mounted on the accessory base 300 from above. The accessory base 300 can be adapted for specific accessories, or it can be made generally usable for accessories of different dimensions.

The tongue fastener 310 is disposed on the left side 304 of the frame 302 at a lower level than the anchor 8, as can be seen in FIGS. 5A and 6A, to enable the accessory 6 to be disposed horizontally when the frame 302 is mounted on the fixtures 200 on opposite upper surfaces 12L, 12R of the tunnel 4 of the snowmobile 1. The tongue fastener 310 and the anchor base 20 are integrally attached to the frame 302, however, it is contemplated that the anchor 8 could be removably attached to the frame 302 (or to the anchor fixture 200). An anchor aperture 230 could be provided on the frame 302 for the removable attachment of the anchor 8, or an anchor bracket 202 having an anchor aperture 230 could be attached to the frame 302 for using the anchor 8 to attach an accessory 6 to a vehicle surface 12 as can be seen in FIG. 9. This would be a useful feature, for instance, for using the accessory base in different configurations, such as spacing or orientation, of anchor fixtures 200 in different vehicles, or in different parts of the same vehicle. Similarly, it is also contemplated that a tongue bracket 310 with a toe-in 311 could be separate from the accessory base 300 and fastened thereto.

The accessory 6 of FIGS. 1B, 7A-7C and 10C-10D is a jerry can 6 used on a snowmobile 1 to transport fuel. The jerry can 6, is shown uncapped in FIG. 7A and capped in FIG. 7B. The jerry can 6 is shown with the lever 30 and the rubber strap 50 attached in FIG. 7B and with the rubber strap 50 removed in FIG. 7C.

The accessory 6' of FIG. 8 is a bag 6' mounted on an accessory base 300' according to a second embodiment. Corresponding features of the accessory bases 300 and 300' that are similar have been marked with the same reference number and will not be discussed herein in detail. Features of the accessory base 300' that are different from the corresponding features of the accessory base 300 have been marked with an apostrophe after the reference number. Instead of criss-crossing ribs 308, the frame 302' of the accessory base 300' has a substantially continuous surface 312'. An anchor 8 is attached on the left end 304' and a tongue fastener (not visible) on the right end 306' of the frame 302'.

The accessory 6" of FIGS. 9 and 10 is a side bag 6" having a different attachment mechanism compared to the jerry can 6 or bag 6' which are laterally elongated and attached to two laterally spaced attachment fixtures 200 via a tongue fastener 310 and an anchor 8. The side bag 6", which is comparatively less extended in the lateral direction and more extended in the vertical direction than the jerry can 6 and bag 6'. The side bag 6" has an anchor bracket 202 attached in the center of a vertically extending surface 252 which faces the side surface 13 of the tunnel 4 when the side bag 6" is mounted thereon. A keyhole shaped pin-slot 250 is defined in the surface 252 directly below the anchor bracket 202 towards the bottom of the surface 252.

The anchor bracket 202 is a flat plate 203 extending horizontally outwards from the surface 252, and having an anchor aperture 230 defined in the center thereof to receive an anchor 8. The bracket 202 can be used to anchor the sidebag 6" to another anchor bracket 202, or to an anchor fixture 200, using an anchor 8. FIG. 10B shows another embodiment of an anchor bracket 202'. The anchor bracket 202' is similar to the anchor bracket 200 except that the bracket 202' has surfaces 204 extending downwards from the edges of the horizontal plate 203 perpendicular to the surface 252 and from the edge of the plate 203 adjacent and parallel to the surface 252. The surfaces 204 are designed to fit around the exterior surfaces 216, 218 and 220 of the anchor fixture 200 while leaving the tongue fastener aperture 240 unobstructed. The surfaces 204 aid in aligning the anchor apertures 230 of the anchor bracket 202' and anchor fixture 200, and in preventing the anchor bracket 202' from sliding laterally off the anchor fixture 200 before being fastened with an anchor 8.

A pin 254 (FIG. 10A), having a head and a stem, can be locked in the key-hole shaped slot 250 by inserting the pin-head into the centre of the circular portion of the key-hole shaped slot 250 and then displacing the pin 254 along the linear section so that the pin 254 cannot be removed from the slot 250 since the linear section has a narrower width than the pin-head. The pin 254 and key-hole shaped slot 250 are used to fasten the side bag 6" to the vertical surface 13 having the pin 254 and extending below the horizontally disposed surface 12 having the anchor fixture 200 disposed above the pin 254. The side bag 6" is fastened with the pin 254 to provide stability to the side bag 6" after the anchor bracket 202, 202' of the side bag 6" has been placed on an anchor fixture 200 and before the anchor bracket 202, 202' has been fastened with an anchor 8. It is contemplated that the anchor bracket 202, 202" could be disposed at anon-normal angle to the surface 252 and the side bag 6" could be mounted to adjacent surfaces 13 at an angle other than perpendicular to each other. It is also contemplated that multiple slots 250 and multiple anchor brackets 202 could be provided for mounting sidebags 6", for example, if the side bag 6" is longer or wider than the one shown in FIG. 8, or if the side bag 6" is designed to carry relatively heavier items.

Figure 10A:
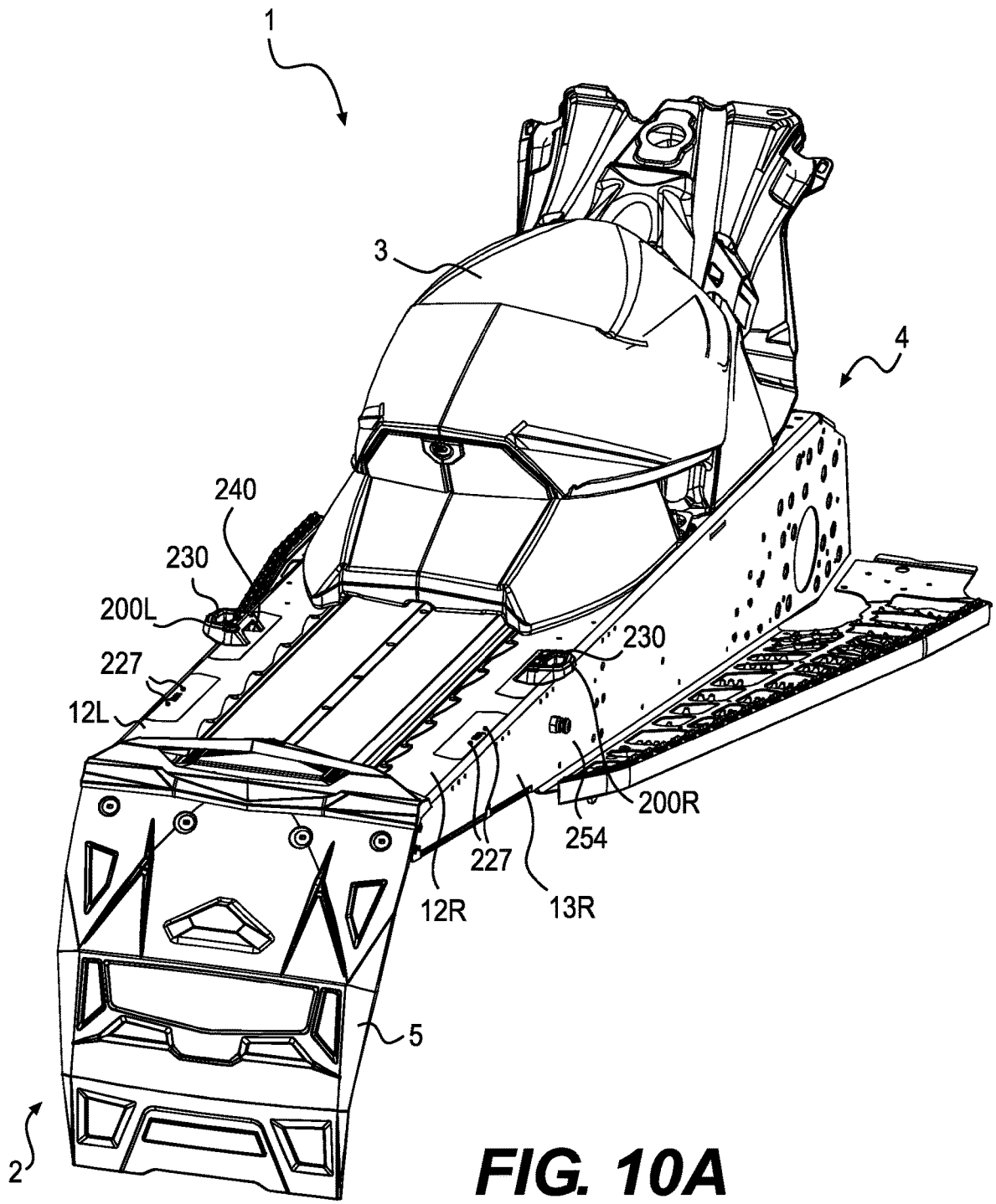
FIGS. 10A-10D are perspective views of portions of the snowmobile taken from a rear, right side thereof illustrating the steps for mounting two side bags and a jerry can to the tunnel of the snowmobile.
Figure 10B:
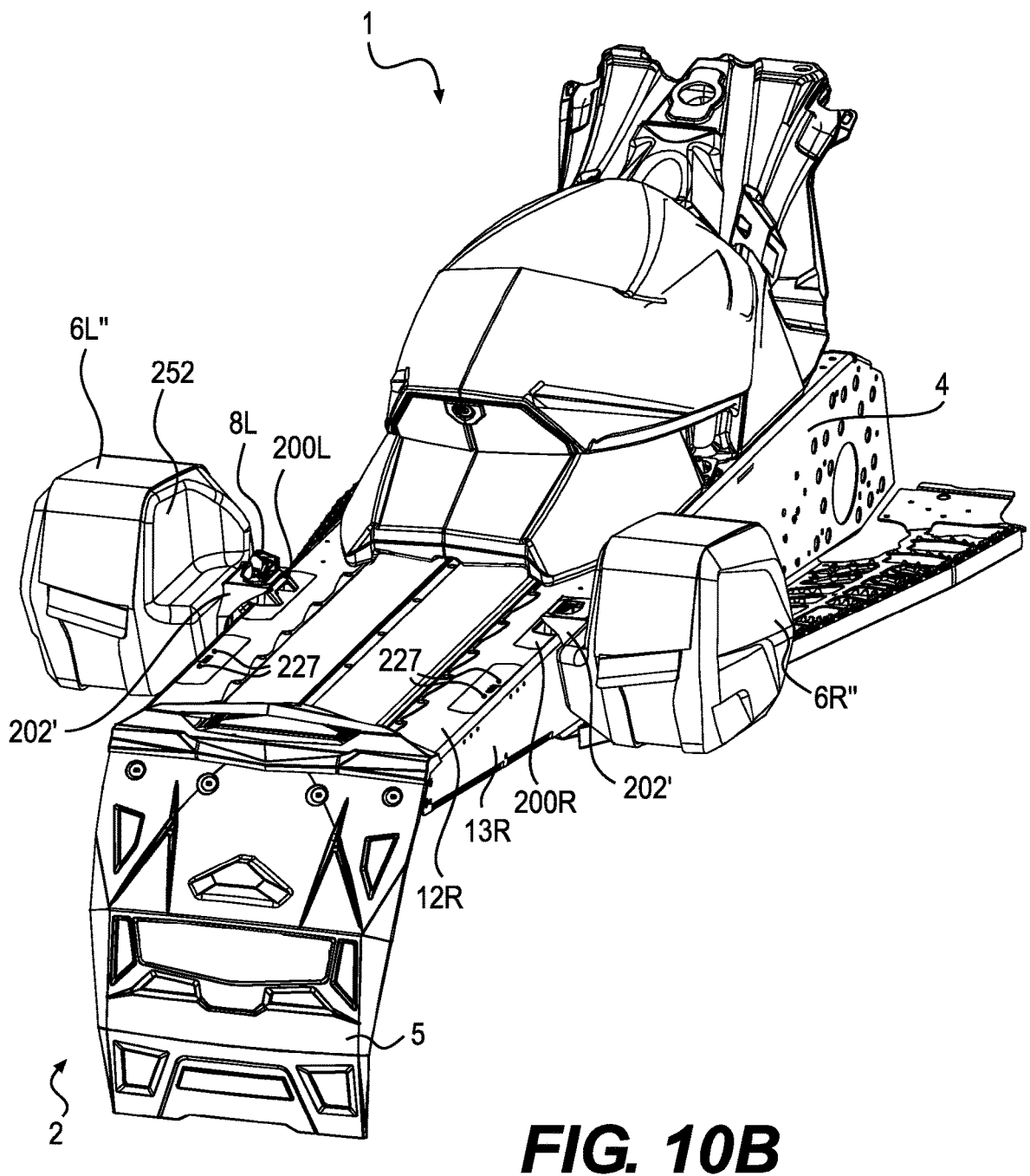

With reference to FIGS. 10A to 10D, the use of anchor fixtures 200 for the attachment of multiple accessories to a vehicle surface will now be discussed. Referring to FIG. 10A, the accessories are mounted on the tunnel 4 of a snowmobile 1. The tunnel 4 has anchor fixtures 200L and 200R attached on opposite sides on the top left 12L and top right 12R surfaces. A pin 254 is mounted on each side surface 13R and 13L below the respective anchor fixtures 200R and 200L.

Referring to FIG. 10B, sidebags 6L" having anchor brackets 202L' and sidebag 6R" having the anchor bracket 202R' are first mounted respectively on the anchor fixtures 200L and 200R such that the anchor aperture 230 of each anchor fixture 200L, 200R is aligned with the anchor aperture 230 of the corresponding anchor bracket 202L, 202R'. The key-hole shaped slots 250 of each sidebag 6L", 6R" is engaged with the corresponding pin 254L, 254R on the corresponding side surfaces 13L, 13R of the tunnel 4 to support the sidebags 6L", 6R" before being fastened to the respective anchor fixture 200L, 200R. The sidebag 6L" is fastened to the anchor fixture 200L with an anchor 8L.

Figure 10C:
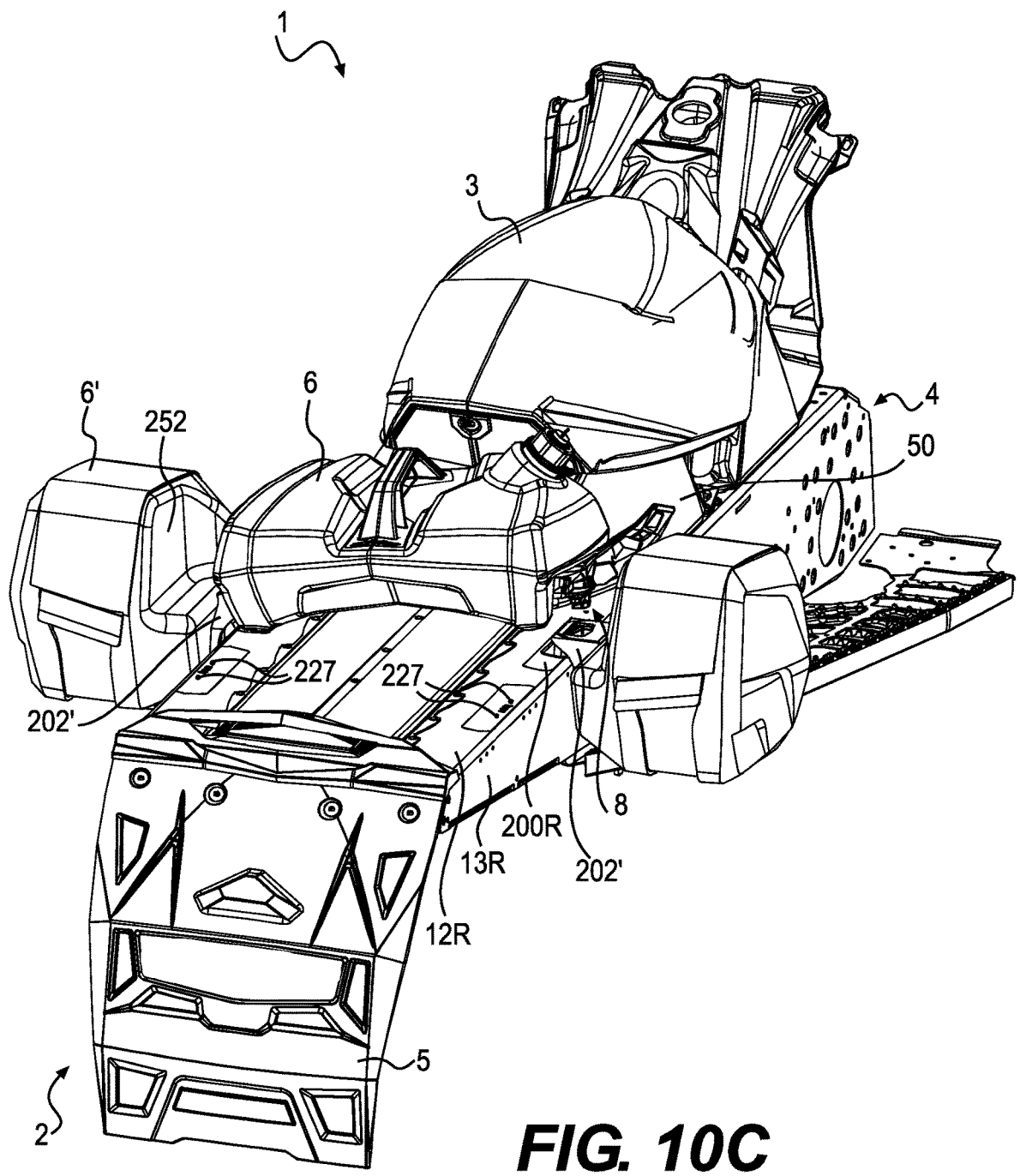

Referring to FIG. 10C, a jerry can 6 mounted to an accessory base (not shown) having a tongue fastener 310 on the left side and an anchor 8 on the right side is then mounted on the anchor fixtures 200L and 200R. The tongue fastener 310 of the jerry can 6 is fastened before the anchor 8. The fastener aperture 240L of anchor fixture 200L is used to fasten the tongue fastener 310 of the jerry can 6 as seen in FIG. 10C.

Figure 10D:
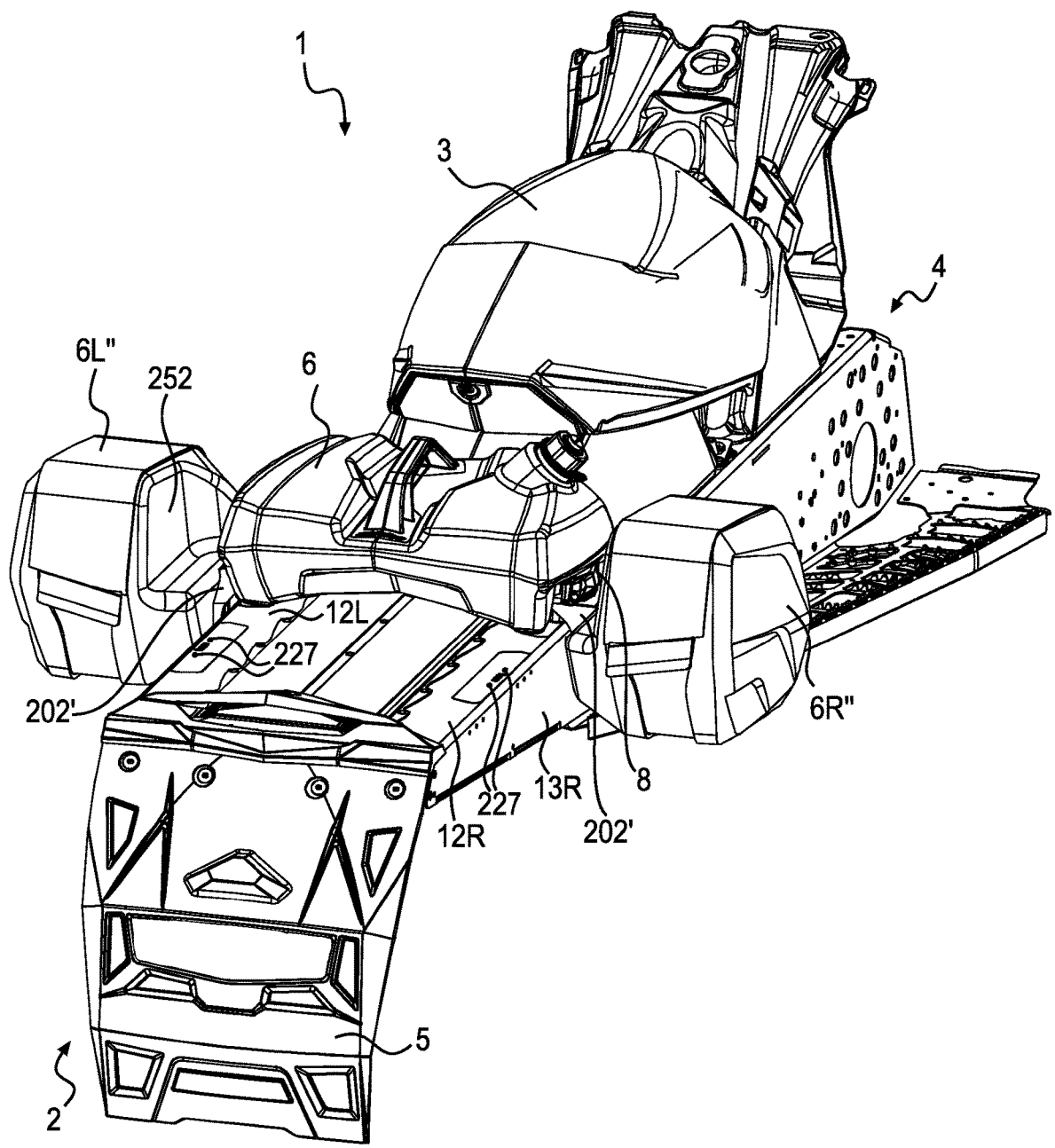

Referring to FIG. 10D, the anchor 8 of the jerry can 6 is finally inserted into the anchor aperture 230' of the anchor bracket 202R' and the anchor aperture 230 of the anchor fixture 200R and locked, thus fastening the right side of the jerry can 6 and the sidebag 6" to the anchor fixture 200R, and thereby achieving the installation of three accessories 6, 6L" and 6R" on the tunnel 4 of the snowmobile 1.

Turning now to FIGS. 11 to 14, a second embodiment of a fixture 500 for detachable mounting of an accessory to a vehicle will now be described. The fixture 500 is used to mount a detachable backrest 70 for a snowmobile passenger seated in a passenger seat 3 behind the driver seat 3. The backrest 70 is attached above the tunnel 4 of the snowmobile 1 using fixtures 500R, 500L mounted respectively on the right and left sides of the tunnel 4. The backrest 70 has a frame comprising a back support portion 72 with a left armrest 74R, and a right armrest 74L respectively on the right and left sides of the back support portion 72. Each armrest 74R,74L is connected to the back support 72 and the corresponding fixture 500R, 500L by an armrest mounting portion 76. The backrest 70 can be detached when not in use. The backrest 70 could be of the adjustable kind with mechanisms for adjusting the height and inclination etc., of the back support 72 and the armrests 74R, 74L.

The left armrest 74L is a mirror image of the right armrest 74R and the left fixture 500L is a mirror image of the right fixture 500R. Corresponding features of the left and right side armrests 74L, 74R and fixtures 500L, 500R are labeled with the same reference number, and will not be discussed separately. The terms "outer" and "inner" with respect to each fixture 500R, 500L, as used hereinafter, are with respect to the relevant tunnel side surfaces 13R,13L when the fixture 500R, 500L is attached to the tunnel 4.

Figure 13A:
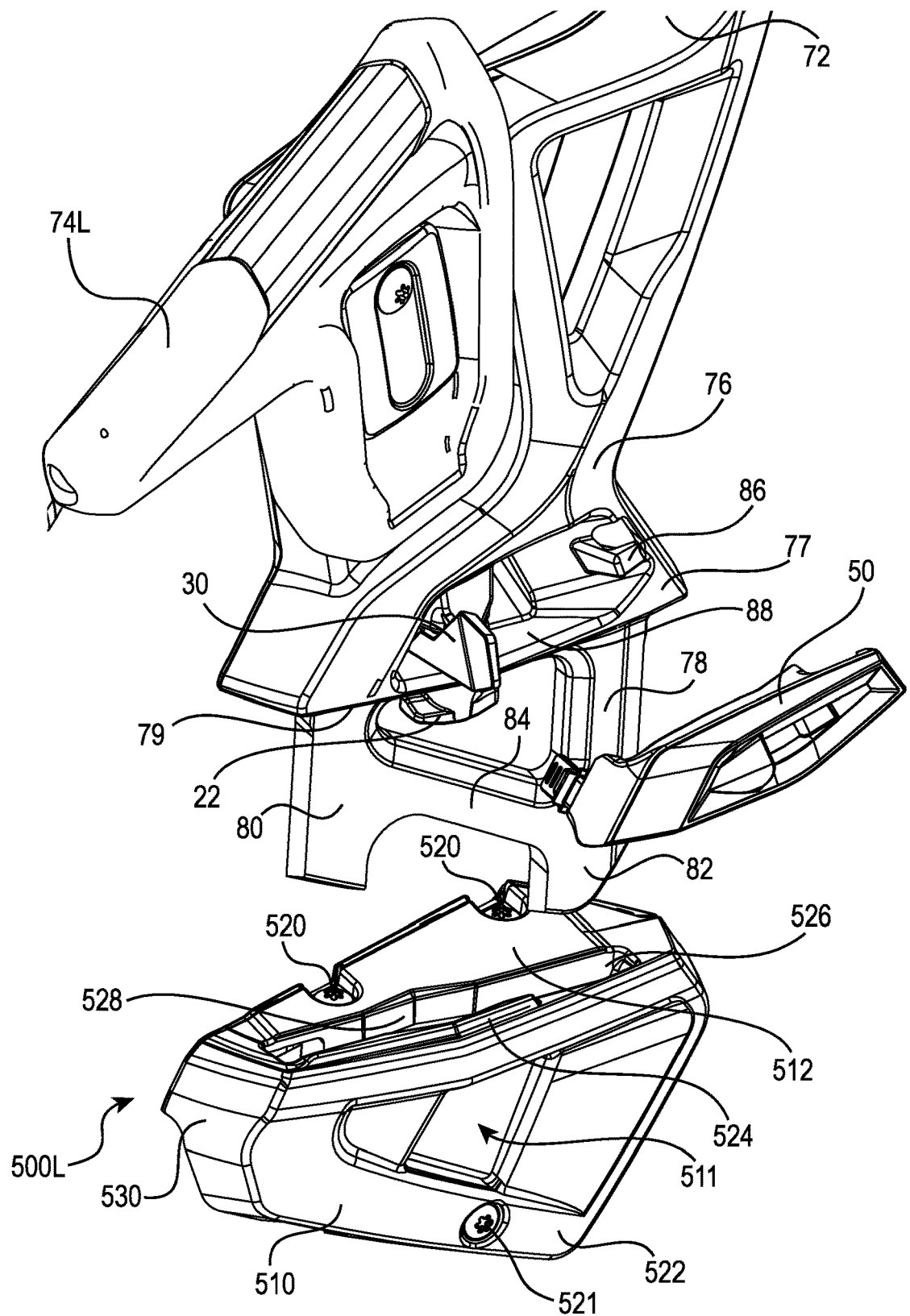
FIG. 13A is a partially exploded perspective view taken from a top, left side of the left armrest and the left fixture of FIG. 11A.
Figure 13B:
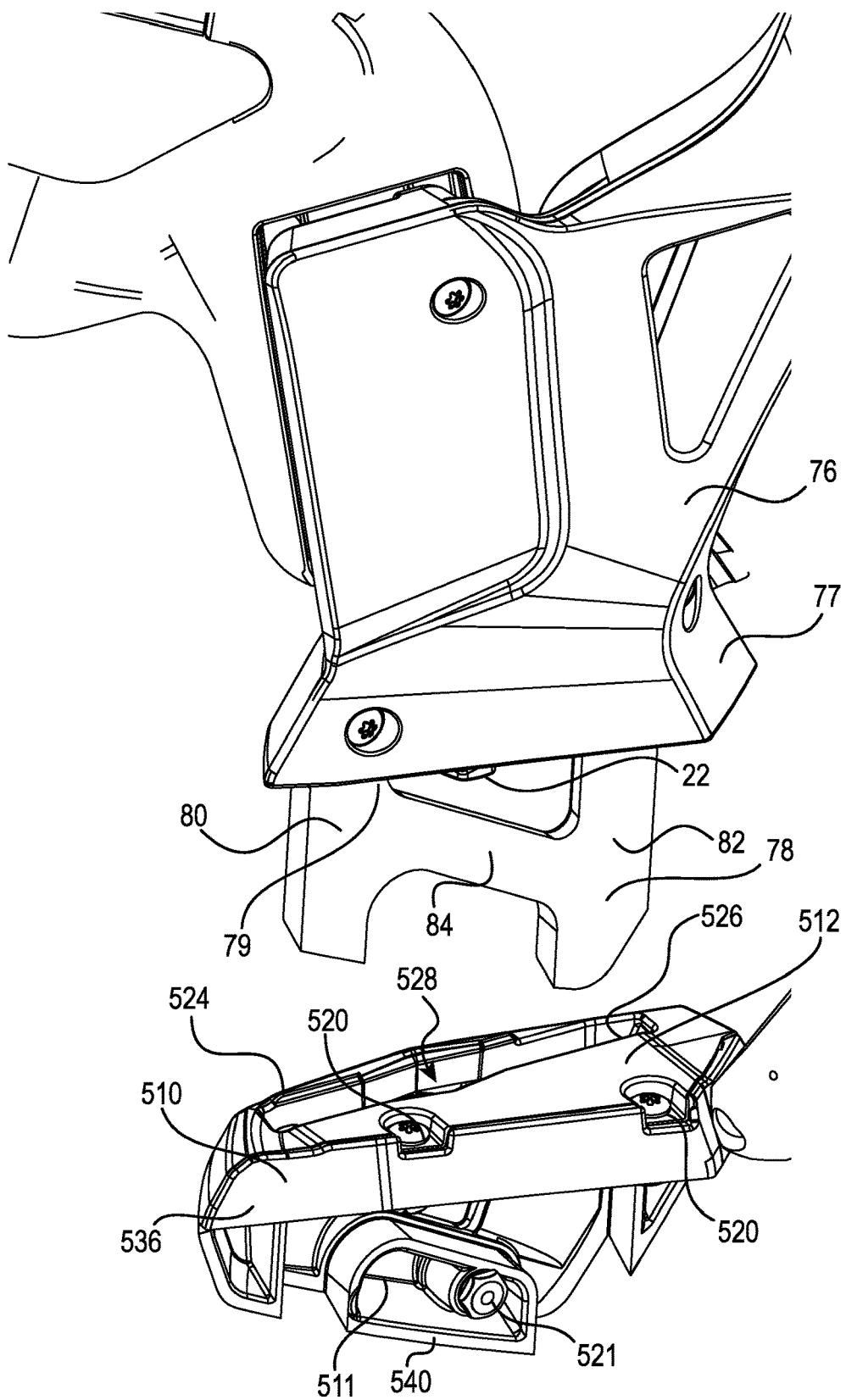
FIG. 13B is a partially exploded view taken from a top, left side of the right armrest and right fixture of FIG. 11A.

As best seen in FIG. 13A, the armrest 74 has a projection 78 extending downwards from the base 77 of the mounting portion 76. The projection 78 has two prongs 80, 82 joined by a bridge 84 extending between the prongs 80, 82. The prongs 82 and 84 are of different lengths and extend downwards from the generally horizontal mounting portion base 77 at an angle to the vertical direction.

An anchor 8 in the mounting portion base 77 serves to fasten the armrest 74 to the fixture 500. The anchor lock 22 of the anchor 8 extends below the lower edge 79 of the mounting portion base 77 in the space between the prongs 80 and 82 and above the bridge 84. A lever 30 of the anchor 8 extends outside the mounting portion 76 to move the anchor lock 22 between the locked and unlocked positions to fasten and unfasten the armrest 74 with the fixture 500. A strap 50 is attached to a hook 86 behind the lever 30. The lever 30 and the hook 86 are disposed in a niche 88 above the mounting portion base 77. The lever 30 is connected to the anchor lock 22 through the lower wall of the niche 88. A portion of the lever 30 extends out of niche 88 in the open position and is disposed within the niche 88 in the closed position. The hook 86 is attached on the rear wall of the niche 88. One end of the strap 50 is attached to the hook 86 and the other end can be extended over the lever 30 in the closed position and held between the front wall of the niche 88 and the lever 30. It is contemplated that a hook, or other attachment means could be provided on the both the front and rear walls of the niche 88 to hold the two ends of the strap 50. It is also contemplated that the anchor 8 could not be disposed in a niche, or that instead of the lever 30, a button or other actuator means be provided on the mounting portion 76 for moving the anchor lock 22 between locked and unlocked positions.

The fixture 500 has a body 510 with an upper wall 512 which is fastened to the upper surface 12 of the tunnel 4. Fastener holes 520 near the inner edge 518 are provided for attaching the fixture 500 to the tunnel 4 using the fastener holes 227 on the upper surface 12 of the tunnel 4. An outer wall 522 extends generally vertically downwards from the outer edge 516 of the upper wall 512. An elongated slot 526 in the upper wall 512 has a wider section 528 in the middle portion to allow the anchor 8, of the armrest 74 to be inserted through the slot 526. The prongs 80 and 82 of the armrest projection 78, disposed on either side of the anchor 8 of the armrest 74, enter the slot 526 on either side of the wider section 528. When inserted through the slot 526 and moved to the locked position, the anchor lock 22 engages the lower surface 550 (FIG. 14F) of the upper wall 512 directly adjacent the wider section 528 of the slot 526, and the anchor base (not shown) engages an upper surface (not shown) in the armrest mounting portion base 77, thus anchoring the armrest 74 and the fixture 500 together.

The upper wall 512 is fastened to the tunnel upper surface 12 such that the vertical outer wall 522 is spaced from the respective tunnel side surfaces 13. The upper wall 512 has a ridge 524 adjacent the outer edge 516 that engages the armrest mounting base 77 at an inner surface adjacent to the lower edge 79 of the mounting portion 76. It is contemplated that the ridge 524 could be omitted, or some other structure be used to engage the mounting portion base 77.

The vertical wall 522 has front 530 and rear 532 vertical sections wrapping around to the front and rear of the fixture 500. It is contemplated that the walls 530 and 532 could not be provided. The vertical wall 522 extends from a top outer edge 516 of the upper wall 512 to a bottom edge 514. A fastener hole 521 is defined in the outer wall 522 for attaching the fixture 500 to the tunnel side surface 13. The fixture body 510 has a gap 511 corresponding to the space between the prongs 80, 82 of the armrest projection 78 which is inserted into the fixture body 510. The gap 511 facilitates handling of the fixture 500 during attachment of the fixture 500 to the tunnel surfaces 12, 13, however, it is contemplated that the body 510 could be continuous without gaps, or that other means for handling the fixture 500 could be provided.

It is contemplated that the shapes and contours of the walls 512, 522, 530, 532 of the fixture body 510 could be different. The slot 526 could be shaped differently based on the shape of the anchor 8 and the projection 78 extending downwards from the armrest mounting portion base 77. The fixture 500 and the armrest projections 80, 82, 84 are contemplated to be symmetrical so as to be usable for attachment of accessories on either the right or the left sides. It is also contemplated to have multiple slots instead of a single slot 526.

Figure 14A:
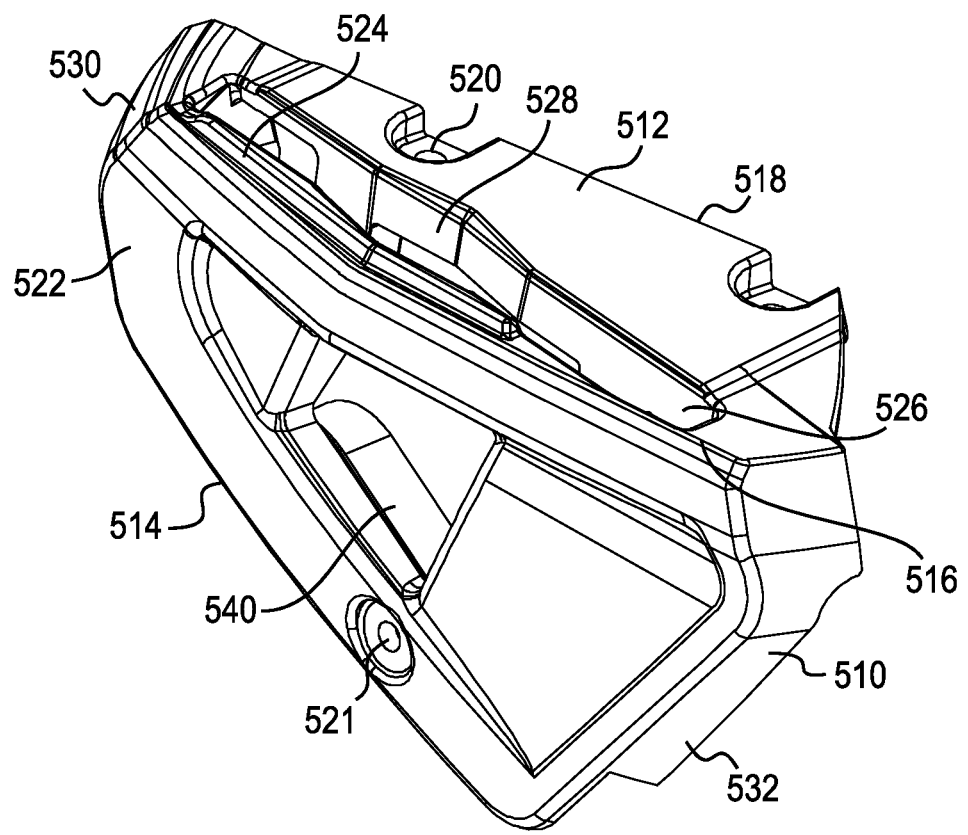
FIGS. 14A-14F are close-up views of the left fixture of the snowmobile of FIG. 11A.
Figure 14C:
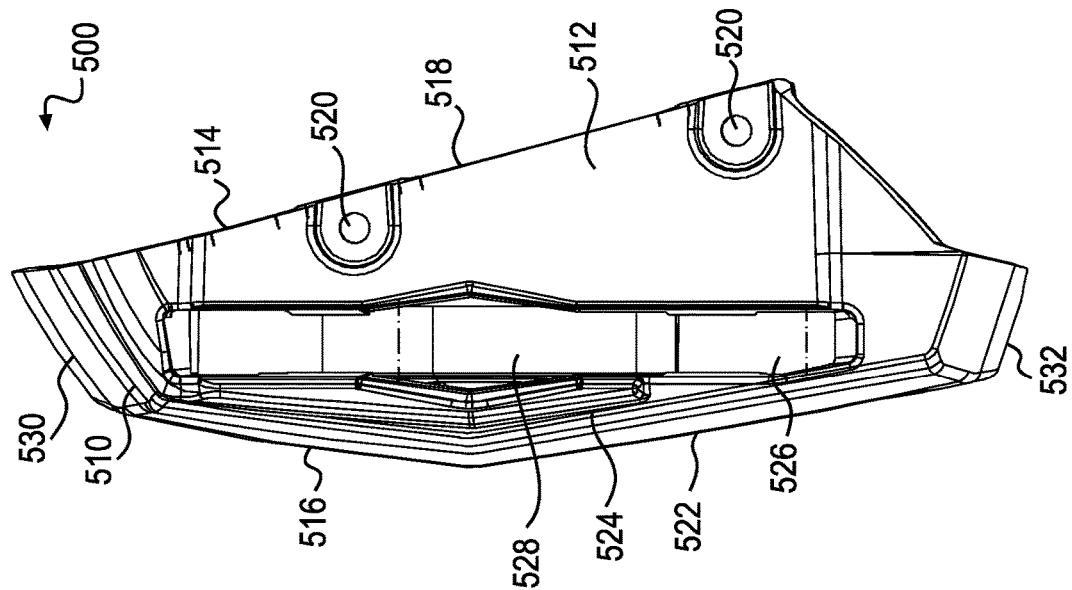
Figure 14B:
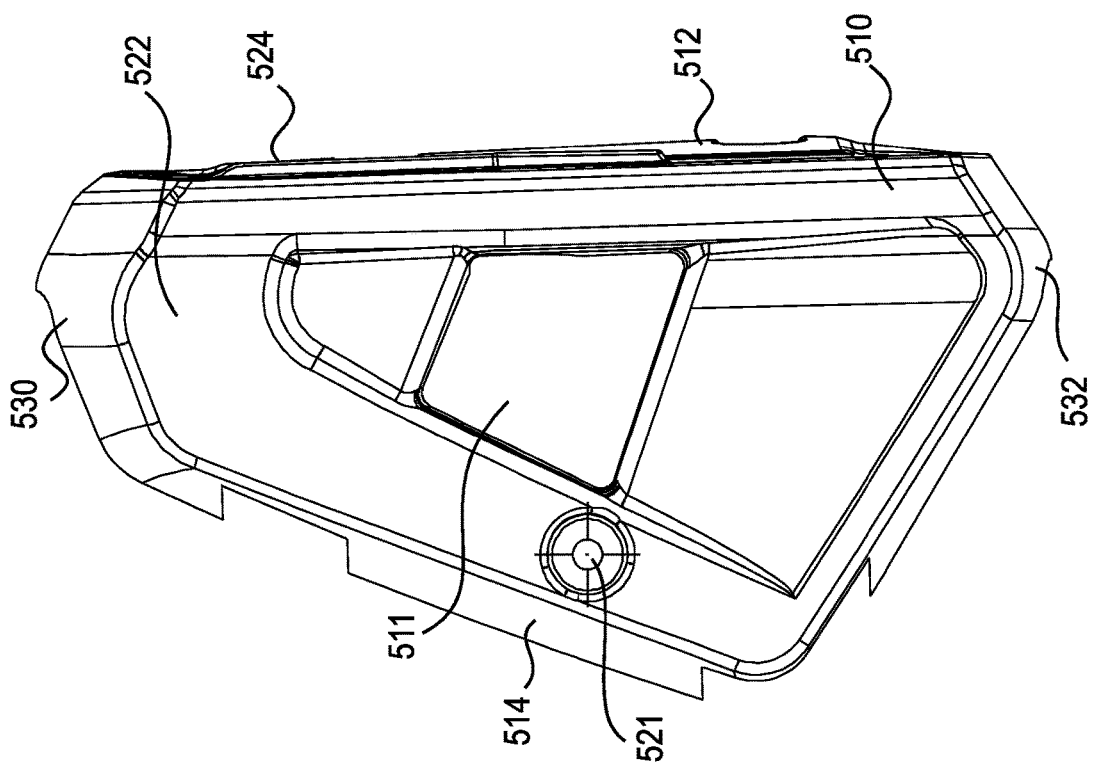
Figure 14E:
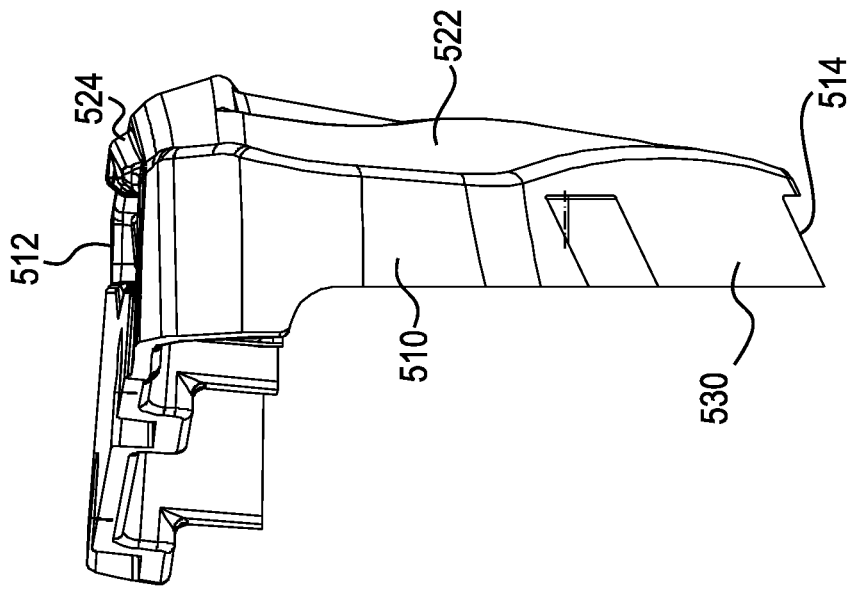
Figure 14D:
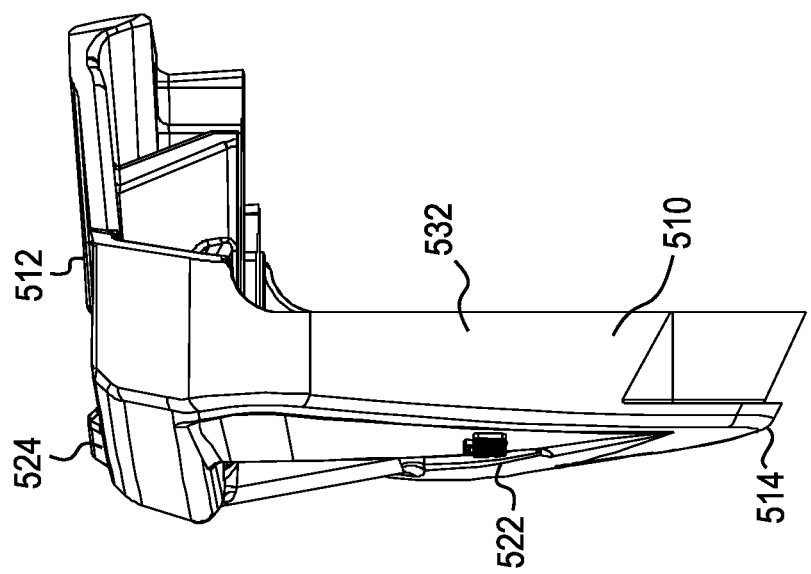
Figure 14F:
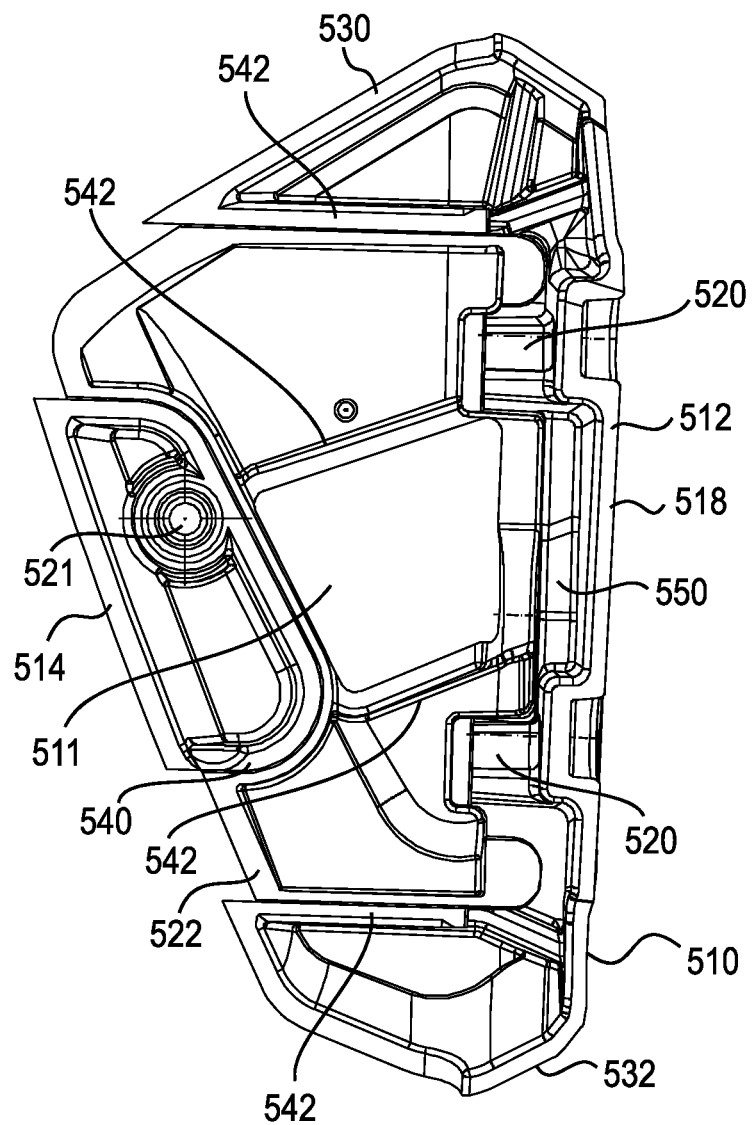

With reference to FIG. 14F, the inner surface of the vertical wall 522 has several projections extending inwards from the wall 522 towards the side tunnel surface 13 when the fixture 500 is attached to the tunnel upper surface 12. A projection 540 is shaped to mate with the lower surface of the bridge 84 and the prongs 80, 82 on the side surfaces. The projection 540 also defines the fastener hole 521. The projection 540 blocks the downward motion of the prongs 80, 82 when inserted into the fixture 500. Projections 542 which define the gap in the outer wall 522, abut the side surfaces of the prongs 80, 82 when the armrest 74 is installed in the fixture 500. The projection 540 and 542 prevent forward and backwards motion of the armrest mounted 74 in the fixture 500. The projections 540, 542 in the fixture 500 are in the form of walls and surfaces enclosing hollow spaces, however, they are contemplated to define other structures, either solid or hollow.

When the armrest 74 is fully inserted in the fixture 500, the bridge 84 is supported on the projection 540. It is contemplated that the anchor lock 22 could be aligned with the lower surface 550 of the upper wall 512 directly adjacent the wider section 528 of the slot 526 when the fixture 500 is supported on the projection 540. Thus, in the locked position of the anchor 8, the armrest 74 would be additionally held in the fixture 500 by the anchor lock 22 engaging the lower surface 550 of the upper wall 512 from underneath and the bridge 84, disposed below the anchor lock 22, engaging the upper surface of projection 540 from above.

It is also contemplated that the anchor base 20 and anchor lock 22 could engage respective upper and lower surfaces of a horizontal projection inside the fixture 500 parallel to the slot 526, instead of the lower surface 550 of the upper wall 512 and an upper surface in the armrest mounting portion base 77, in order to anchor the armrest 74 to the projection 550 and preventing it from being pulled out of the fixture 500. This configuration could be useful for instance, if the upper wall 512 has a thickness different than the separation between the anchor base 20 and anchor lock 22.

An inner plate 536 (best seen in the fixture 500R shown in FIG. 13B) extends downwards from the inner edge 516 of the upper wall 512. The inner plate 536 is removably attached to the upper wall 512 by the fasteners in the holes 520 which attach the upper wall 512 of the fixture 500 to the tunnel upper surface 12. The inner plate 536 prevents access to the portion of the interior of the body 510 extending above the level of the tunnel upper surface 12. It is contemplated that the inner plate 536 could extend further down or that the inner plate 536 not be provided. It is also contemplated that the inner plate 536 could be attached fixedly to the upper surface 512.

The fixtures 200, 500 have been described exemplarily for attaching to a tunnel 4 of a snowmobile 1, however, it is contemplated that the fixtures 200, 500 could be used with any surfaces disposed at other angles and in different locations in the snowmobile 1 or in vehicles other than a snowmobile. The fixtures and attachment mechanisms could be used for wide range of accessories not limited to the ones described herein.

Figures 15A, 15B:
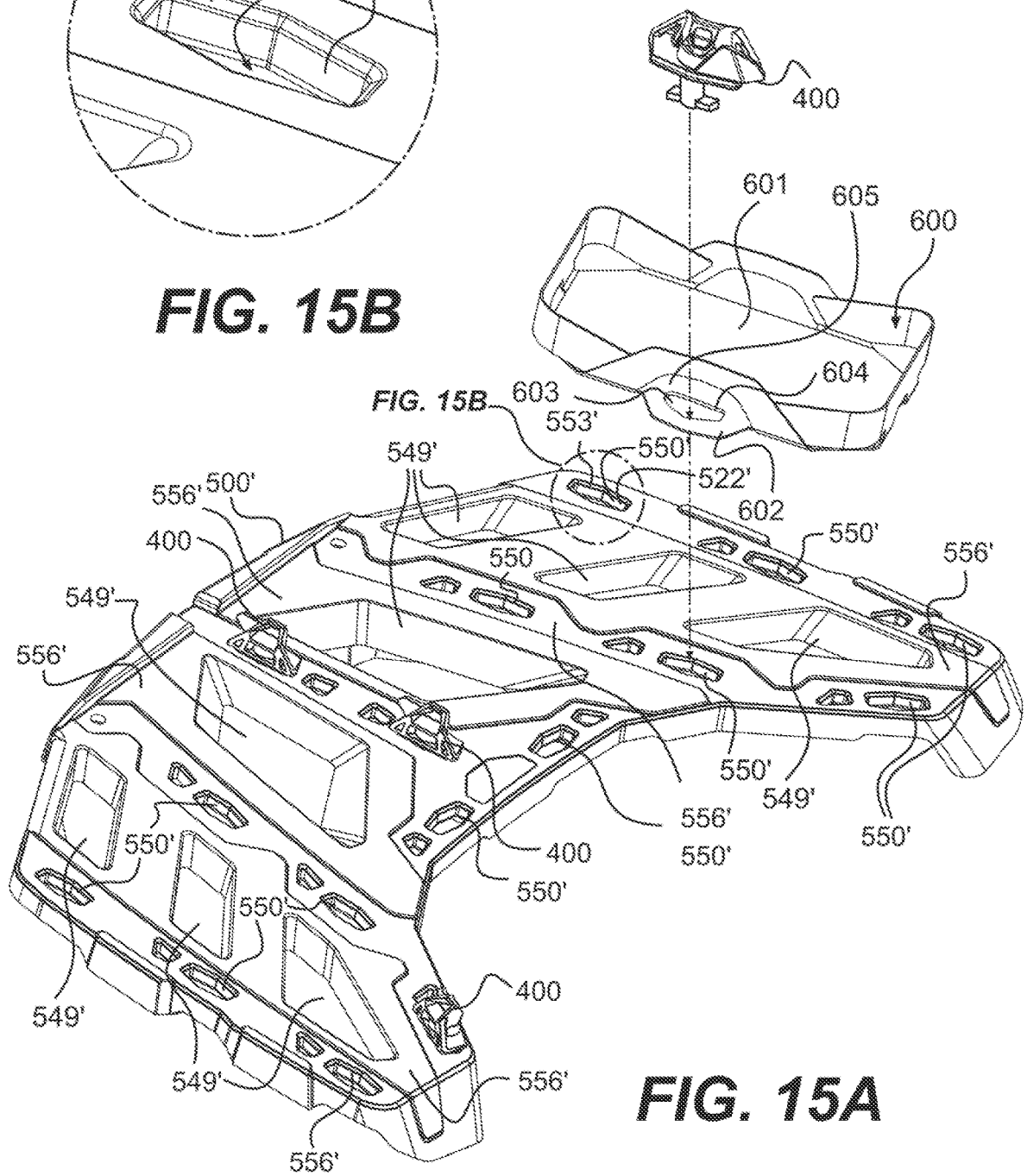
FIG. 15A is a perspective exploded view, taken from a front, left side, of a rear rack of the snowmobile of FIG. 1 with a plurality of anchors and an accessory.
FIG. 15B is a close-up of an aperture of the rack of FIG. 15A.

With reference to FIGS. 15A and 15B, in some embodiments, the snowmobile 1 includes a rack 500' which is an area where cargo items or accessories are to be secured. The rack 500' is a generally flat surface having the plurality of rack apertures 550'. Although the rack 500' is shown as a flat surface with a plurality of rack apertures 550', it is contemplated that the rack 500' could not be flat and could have only one rack aperture 550'. For example, the rack 500' could be as simple as a C-shaped extruded rod with an aperture between ends of the C forming the rack aperture 550'. The rack 500' is made of plastic. It is contemplated that the rack 500' could be made of a material other than plastic.

As best seen in FIG. 15B, each of the rack apertures 550' has a rim 552' and an upper brim 553' (a lower brim not being shown). The rim 552' is an inside surface of the rack aperture 550' between the upper brim 553' and the lower brim. The upper brim 553' is the upper lateral surface of the rack aperture 550'. The upper brim 553' is chamfered. The rack apertures 550' have an irregular hexagonal shape. As will be described in greater details below, the rim 552' and brims (upper brim 553' and lower brim) are congruent with a part (rack receiving part) of an anchor 400. The anchor 400 is an alternative embodiment of the anchor 8 and will be described in more detail below. It is contemplated that the rack apertures 550' could have a shape different from hexagonal. It is contemplated that the rack apertures 550' could be a regular polygon. It is contemplated that the brim 553' could not be chamfered. It is also contemplated that the rack apertures 550' could not be congruent with the anchors 400, as long as the rack apertures 550' allow the anchors 400 to be inserted therein, and the anchor 400 can brace the rack aperture 550', as will be described below. It is contemplated that the rim 552' and the upper brim 553' could have a shape different from each other.

As best seen in FIG. 15A, the rack 500' also has a plurality of apertures 549'. The apertures 549' are larger than the rack apertures 550' and are designed to reduce the weight of the rack 500'. It is contemplated that the apertures 549' could be smaller than the rack apertures 550'. It is also contemplated that the apertures 549' could be omitted.

Also seen in FIG. 15A, the rack 500' has, on a top face, a plurality of pads 556' for providing friction with the accessories or items to be secured on the rack 500'. The pads 556' are made of neoprene. It is contemplated that the pads 556' could be omitted. It is also contemplated that the pads 556' could be made of a different material.

Figure 21:
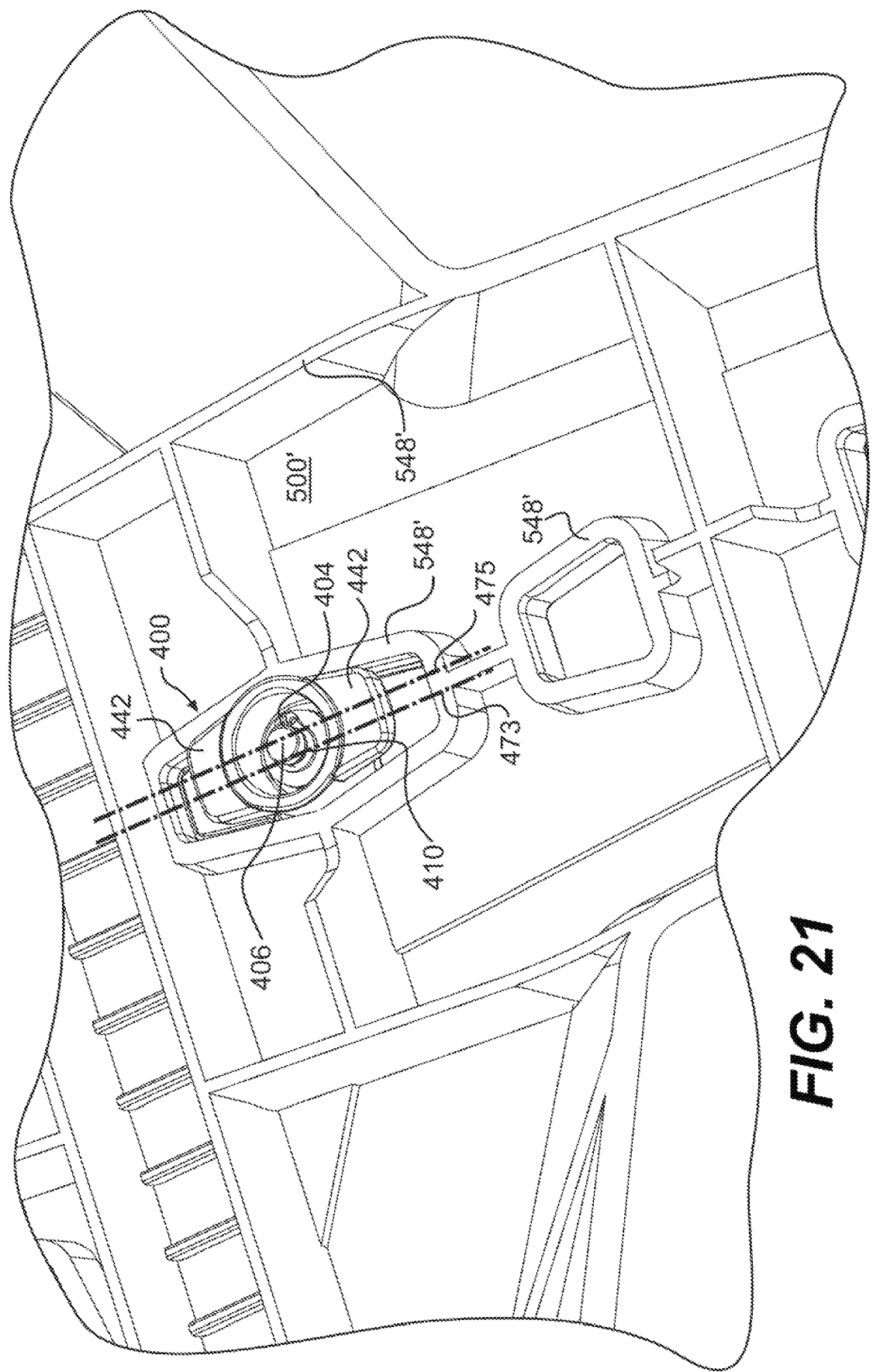
FIG. 21 is a bottom perspective view of the rack of FIG. 15A with one of the anchors shown in the unlocked position.
Figure 22:
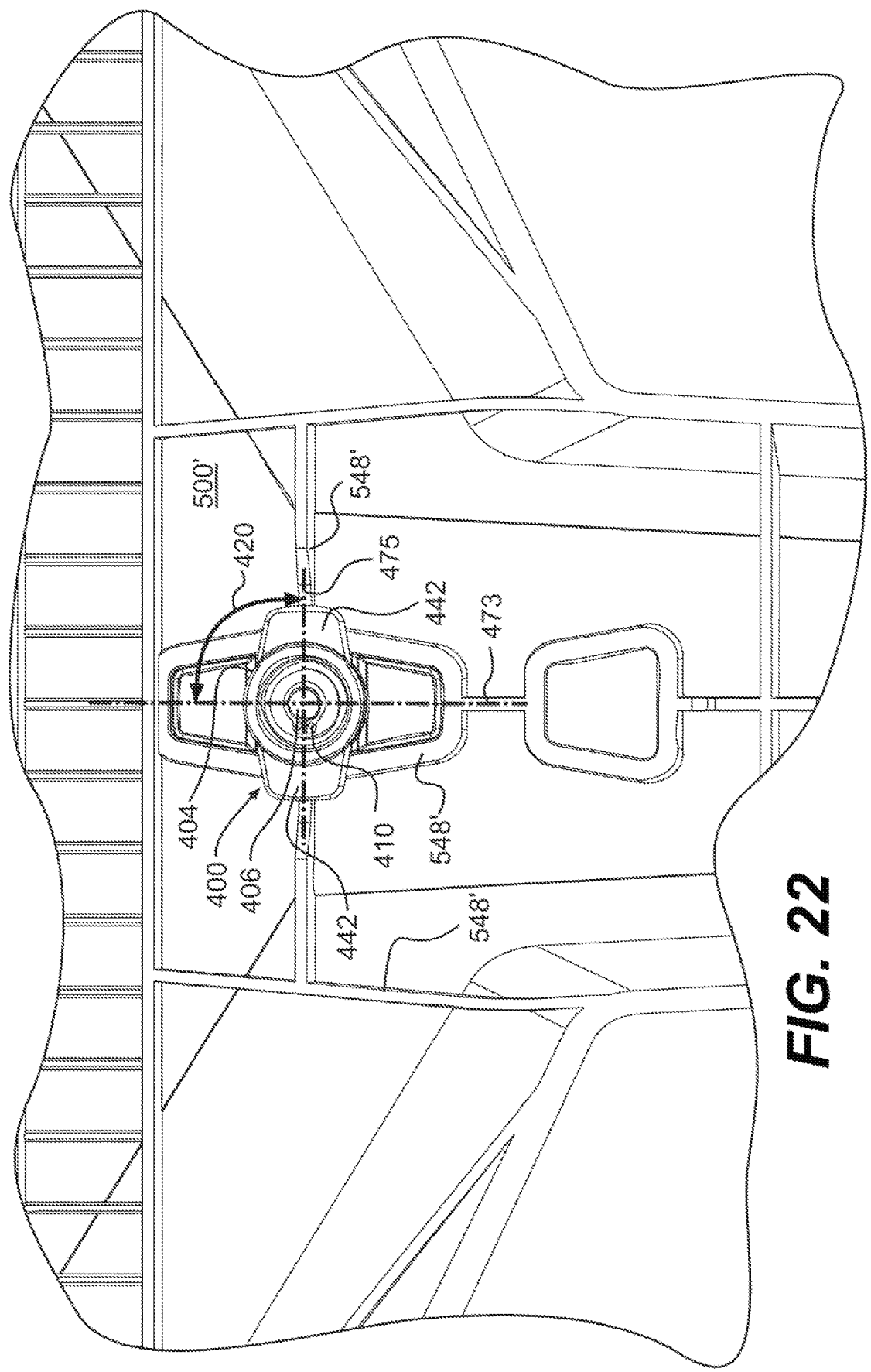
FIG. 22 is a bottom plan view of the rack of FIG. 15A with one of the anchors shown in the locked position.

As best seen in FIGS. 21 and 22, a bottom face of the rack 500' also has a plurality of ribs 548'. The plurality of ribs 548' adds strength to the rack 500' without adding too much weight. Some of the ribs 548' are disposed around the rack apertures 550'. These ribs 548' provide sliding surfaces during locking of the anchors 400, as will be described below. It is contemplated that the ribs 548' could be omitted.

It is contemplated that the rack 500' could have a different orientation and still be used for securing to items or accessories. For example, the rack 500' could be positioned vertically or at an angle.

As best seen in FIG. 15A, a holder 600 is removably connected to the top face of the rack 500' via two of the anchors 400 (only one being shown) securing two opposite sides of the holder 600. As will be described below, the anchors 400 are movable by a user between a locked position where the anchors 400 are secured on the rack 500' and to the holder 600, and an unlocked position where the anchors 400 are not secured to the rack 500' nor the holder 600. As will be described below, it is contemplated that the anchor 400 can also be secured to the rack 500', without securing to the holder 600 via the brim 605 of the aperture 603.

The holder 600 is one example of an accessory that can be secured to the rack 500' via the anchors 400. Other contemplated accessories are bags, vessels, gun racks, etc. The accessories have features designed to operate with the anchors 400 and the rack 500'.

The holder 600 has a holder body 601 and two outwardly extending abutment tabs 602 (only one being shown). An aperture 603 is located in each abutment tab 602. The abutment tabs 602 and the aperture 603 are designed to cooperate with the anchors 400 and the rack aperture 550'. It is contemplated that the aperture 603 could be located on the holder body 601. It is also contemplated that the aperture 603 could be omitted from the abutment tab 602. It is contemplated that one or more than two abutment tabs 602 and apertures 603 could be used to secure the holder 600. It is also contemplated that the abutment tabs 602 could be formed by a recess in the holder body 601. As seen from a top, the aperture 603 has an irregular pentagonal shape. The aperture 603 is congruent with an accessory receiving part of the anchor 400. It is contemplated that the aperture 603 could not be congruent with the anchor 400, as long as the aperture 603 allows the anchor 400 to be inserted partially therein, and allows the anchor 400 to rest on the abutment tab 602 once inserted. The aperture 603 has a rim 604 and an upper brim 605 (a lower brim of the aperture 603 not being shown). The upper brim 605 is flat. It is contemplated that the brim 605 could be chamfered. It is also contemplated that the aperture 603 could not be pentagonal. It is contemplated that in cases where the holder 600 does not comprise an aperture 603 to receive the anchor 400, that the accessory receiving part of the anchor 400 would connect to the abutment tab 602 itself for securing the holder 600 to the rack 500'.

Figure 16:
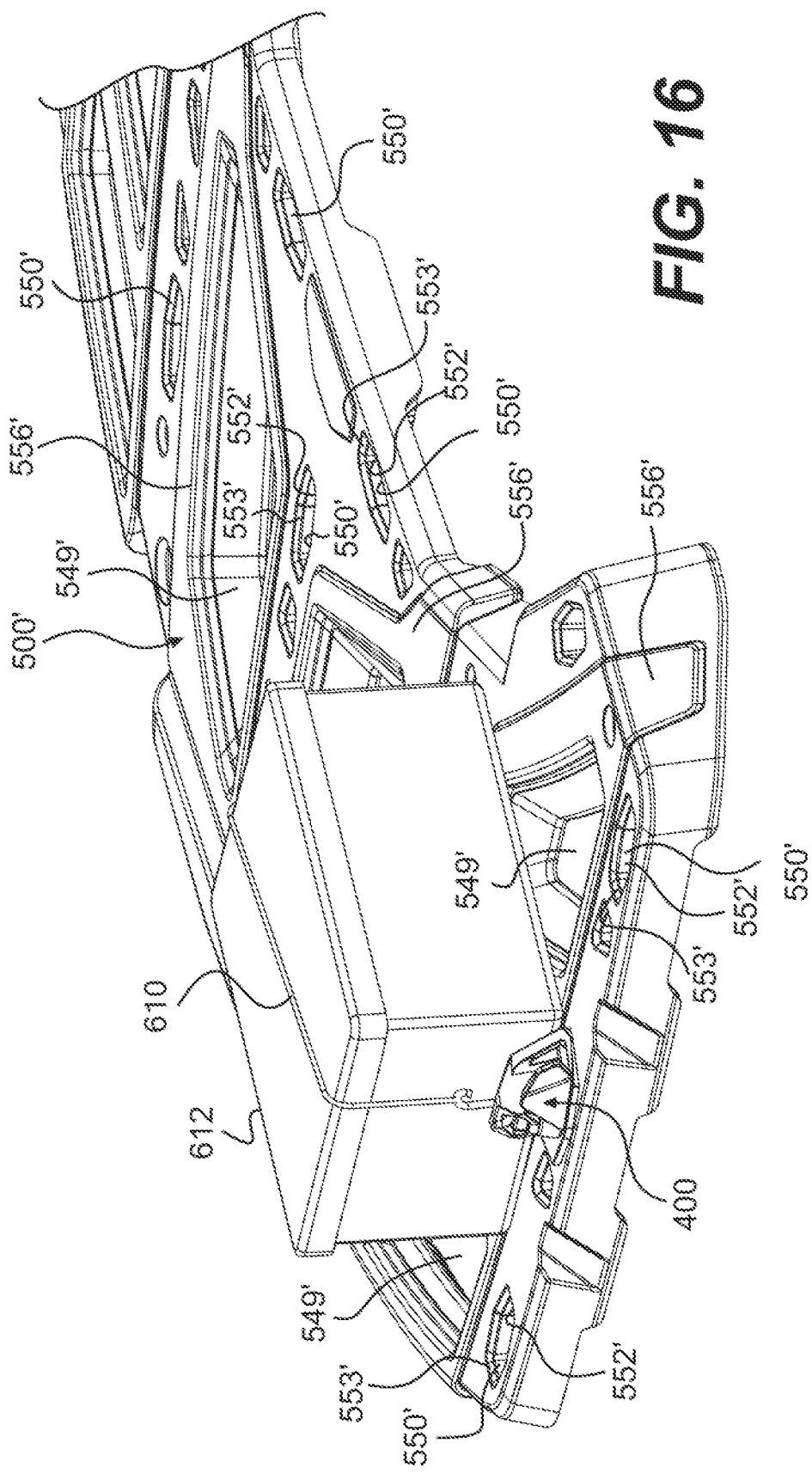
FIG. 16 is a partial view of the rack of FIG. 15A with an item retained by a connector hooked to an anchor.

As best seen in FIG. 16, the anchors 400 can also be used to connect to a bungee cord 610 for retaining a box 612 onto the rack 500'. The box 612 is one example of an item that could be retained by the anchors 400 with the bungee cord 610. Other accessories or items could be food coolers, chain saws, hunting equipment etc. The box 612 is not designed to cooperate with the anchors 400 (although it may be). The bungee cord 610 is one example of connectors that can be used with the anchors 400 to retain the box 612 to the rack 500'. Other connectors could be tie downs, etc. In the configuration of FIG. 16 (which will be described in greater details below), the anchors 400 are conveniently positioned so as to provide a hooking point for the bungee cord 610 in proximity of the box 612. Since the box 612 is not designed to cooperate with the anchors 400, the anchors 400 are not to be inserted in any aperture of box 612. The anchors 400 are further conveniently positioned so as to provide an abutment wall for the box 612. It is contemplated that the anchor 400 could not provide an abutment wall for the box 612. It is contemplated that the anchors 400 could be used to provide an abutment wall and not be used in conjunction with the bungee cord 612.

Turning now to FIGS. 17 to 20, an embodiment of the anchor 400 for the rack 500' will be described.

The anchor 400 has a case 402 and a latch 404 rotatably mounted to the case 402. The case 402 is made of metal and the latch 404 is made of plastic. It is contemplated that the case 402 and the latch 404 could be made of a same material. It is also contemplated that the case 402 and the latch 404 could be made of materials different from metal and plastic, respectively. The latch 404 is connected to the case 402 by a stem 406 extending through the latch 404. The stem 406 is made of metal. It is contemplated that the stem 406 could be made of a different material. The stem 406 has a T-shaped top 407 abutting against a lower wall 411 (shown in FIG. 19) of a cavity 413 (shown in FIG. 19) in the case 402. A C-clip 417 (shown in FIG. 19) is disposed between the T-top 407 of the stem 406 and the lower wall 411 of the case 402 to retain the stem 406 in the case 402. Four spring washers 408 are disposed toward a bottom 409 of the stem 406. The spring washers 408 bias the latch 404 upwards towards the case 402. A C-clip 410 is mounted into a recess 415 (shown in FIG. 17) in the stem 406. The C-clip 410 prevents the spring washers 408 and the latch 404 from sliding off the stem 406. Stem 406 and C-clip 417 are connected to case 402 prior to sliding latch 404 over the bottom end of the stem 406 and securing it to the spring washers 408 and C-clip 410. It is contemplated that a different number of spring washers 408 could be used. It is also contemplated that a biasing mechanism other than the spring washers 408 could be used for biasing the latch 404 toward the case 402. For example, one or more coil springs or a resilient member could be used.

Figure 17:
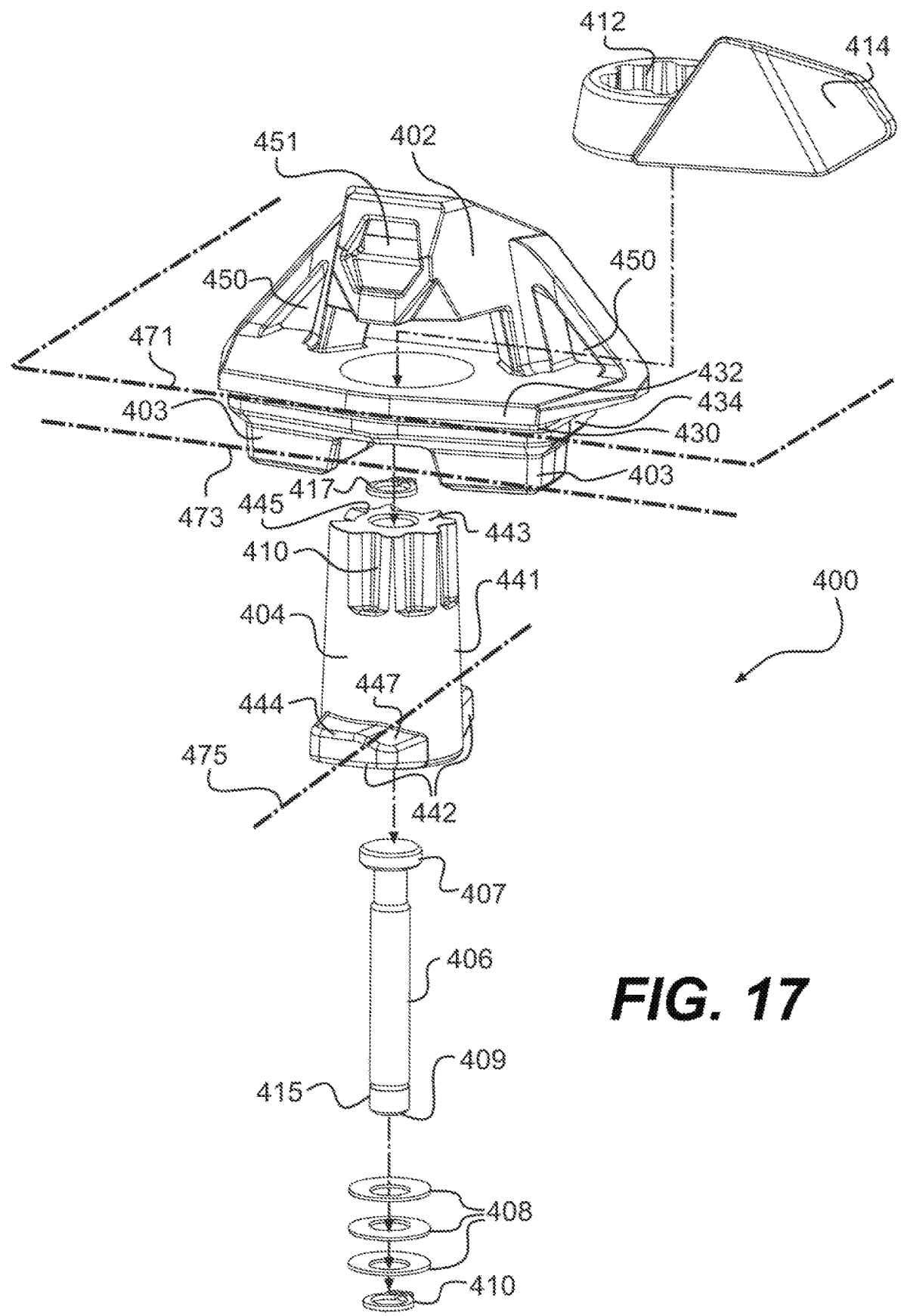
FIG. 17 is an exploded view of one of the anchors of FIG. 15A.

The latch 404 is operated by a lever 414. The lever 414 is made of a same plastic as the latch 404. It is contemplated that the lever 414 could be made of a different material. It is also contemplated that the lever 414 could be replaced by another actuation mechanism. For example the lever 414 could be a button. It is also contemplated that the lever 414 could be omitted. In such a case, the case 402 and the latch 404 could be connected such that the latch 404 would be turned by turning the case 402 itself. It is also contemplated that, in such a case, the anchor 400 could also include a spring loaded mechanism. As best seen in FIG. 17, a top of the latch 404 has a splined end 410 congruent with splines 412 of the lever 414. A top 443 of the splined end 410 has two notches 445. The two notches 445 accept a pin (not shown) on the case 402, and provide an indication that the anchor 400 is in the locked position or in the unlocked position, and that the user has fully rotated the lever 414 so as to not apply unnecessary force to the lever 414 for locking the anchor 400. The lever 414 can rotate by a quarter-turn between a first position (shown in phantom in FIG. 18) where the anchor 400 is unlocked and a second position (shown in solid in FIG. 18) where the anchor is locked. Rotation of the lever 414 is illustrated by arrow 421 in FIG. 18. Rotating the lever 414 forces the latch 404 to rotate and lock/unlock the anchor 400 as will be described in greater details below. It is contemplated that the lever 414 could rotate by more or less than a quarter-turn.

Figure 18:
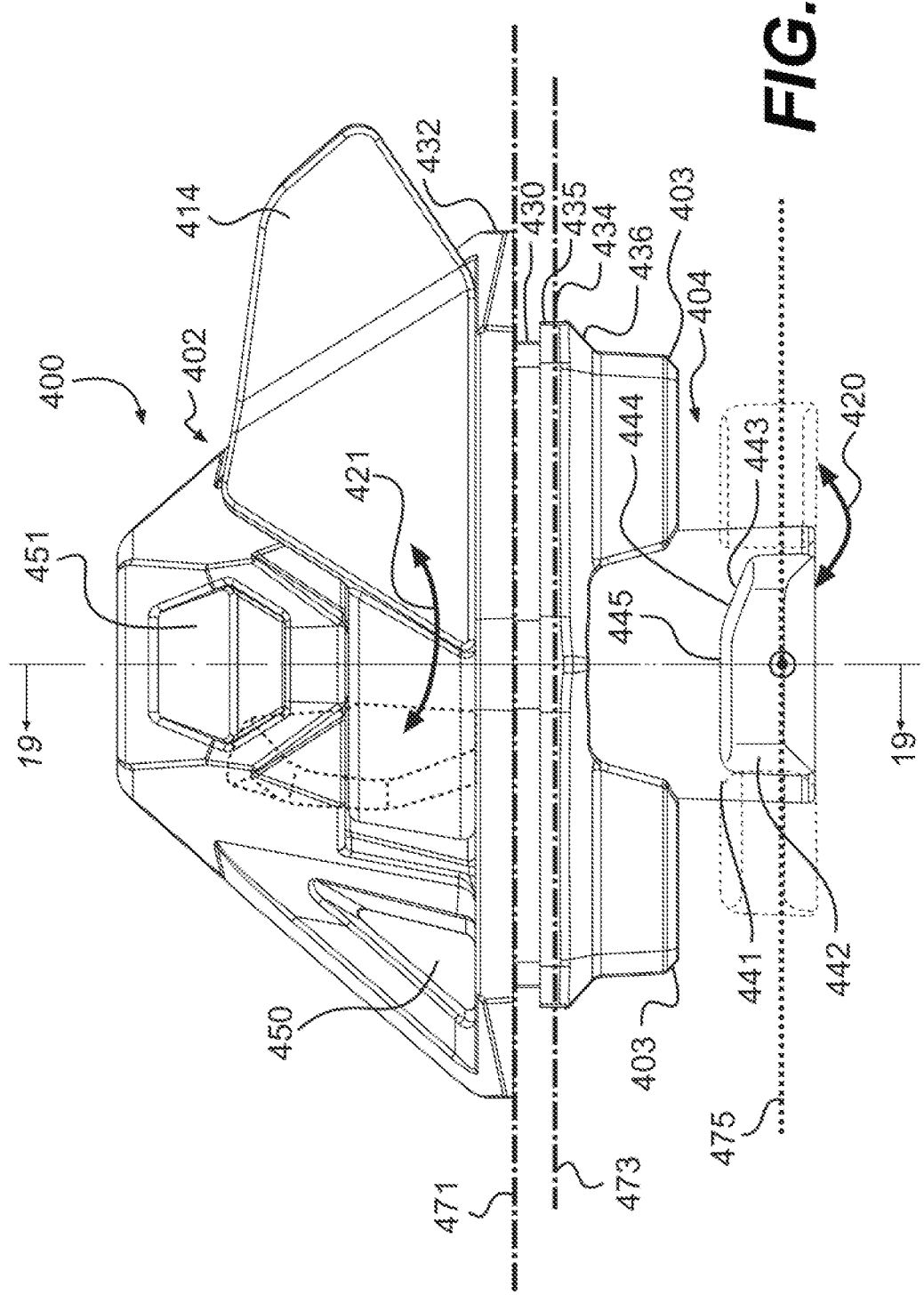
FIG. 18 is a side elevation view of one of the anchors of FIG. 15A in a locked position, and in an unlocked position shown in phantom.
Figure 19:
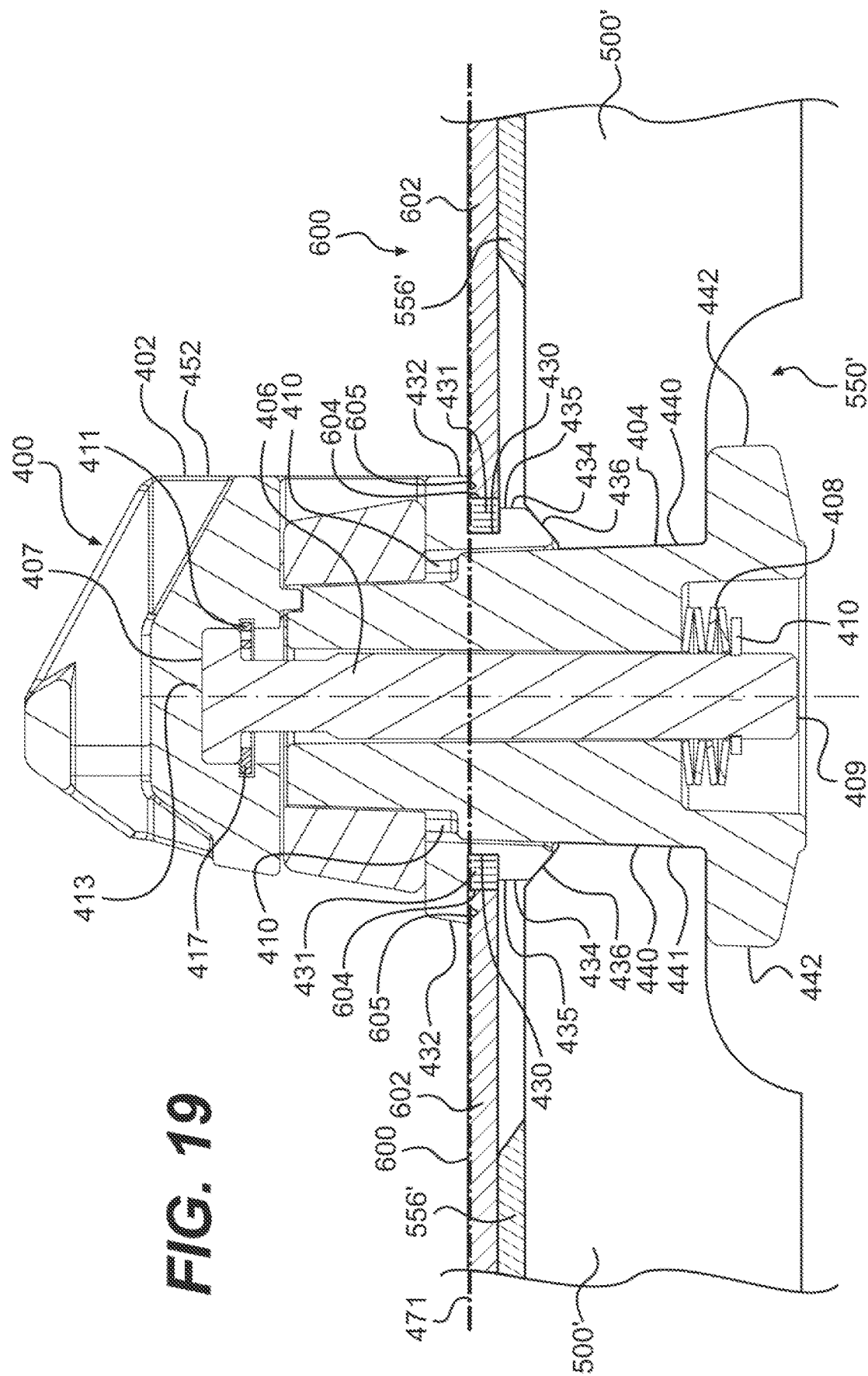
FIG. 19 is a cross-sectional view of the anchor taken along the line 19-19 of FIG. 18, with the anchor shown secured on the accessory and the rack of FIG. 15A.

As best seen in FIGS. 18 and 19, the case 402 has an upper flange 432 and a middle flange 434. The upper flange 432 and the middle flange 434 extend outwardly from an entire external surface of a cross-section of the case 402. It is contemplated that the upper flange 432 and the middle flange 434 could be disposed only on a portion of the external surface of the cross-section of the case 402.

A bottom surface of the upper flange 432 defines a horizontal plane 471 (shown in FIGS. 17-19). When the anchor 400 is inserted into the aperture 603 of the holder 600, a contour of the upper flange 432, projected onto the horizontal plane 471, extends beyond a contour of the aperture 603 (formed by the rim 604), and a contour of the middle flange 434 is contained within the contour of the aperture 603. Because the contour of the middle flange 434 is contained within the contour of the aperture 603, the middle flange 434 can be inserted into the aperture 603 without abutting against it. Furthermore, because the contour of the upper flange 432 extends beyond the contour of the aperture 603, when inserted into the aperture 603, the anchor 400 is prevented by the upper flange 432 from sliding upwards. As will be described below, the upper flange 432 constitutes an element of the accessory connecting part for securing the holder 600 to the rack 500', and the middle flange 434 constitutes an element of the rack connecting part for securing the anchor 400 to the rack 500'.

The middle flange 434 has an upper part 435 and a lower part 436. The upper part 435 is a vertical wall having a thickness about the same as a thickness of the pads 556' of the rack 500'. A recess 430, described below, is formed by and between the upper flange 432 and the upper part 435 of the middle flange 434.

Figure 20:
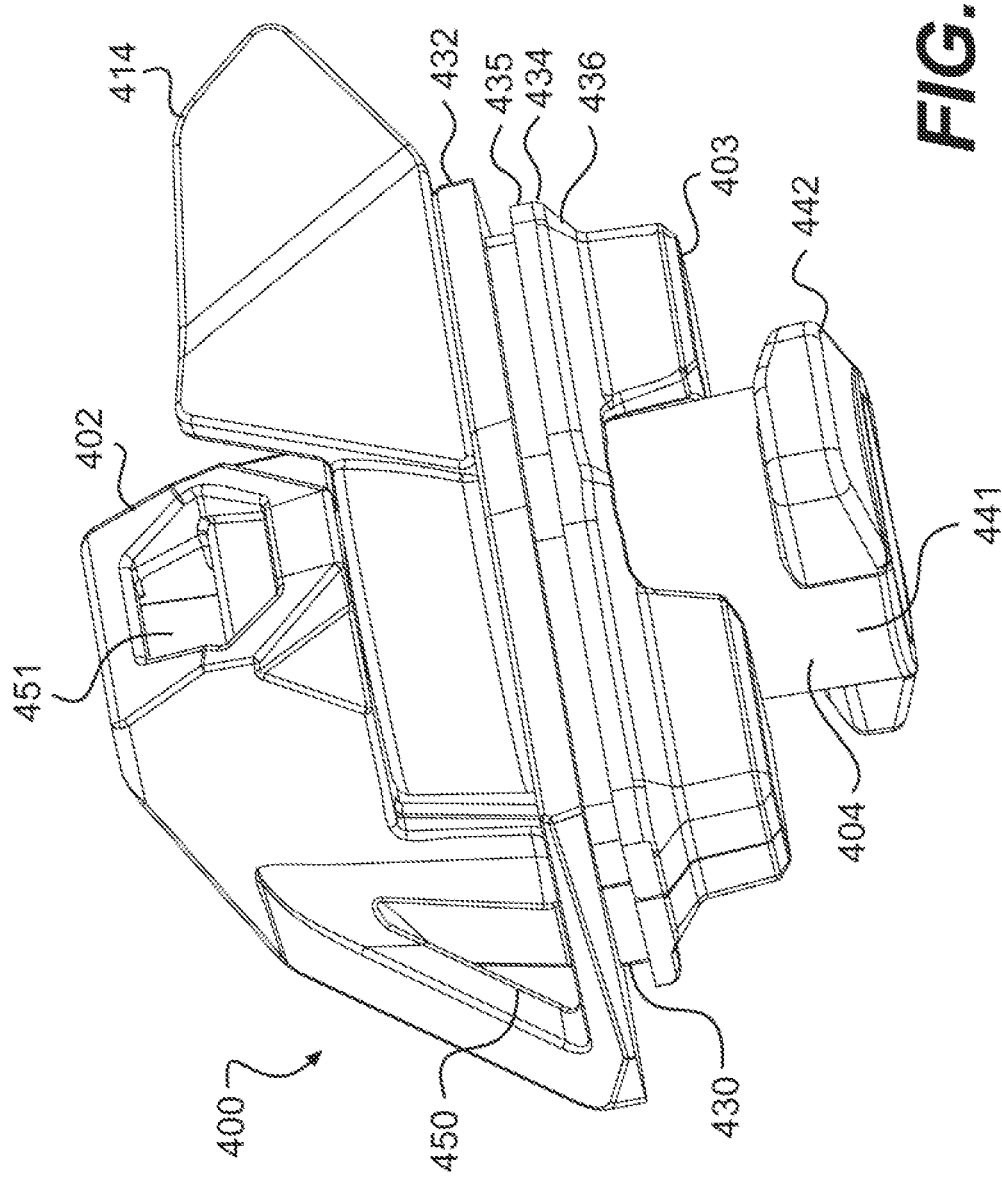
FIG. 20 is a perspective view of one of the anchors of FIG. 15A.

As best seen in FIG. 20, in one embodiment of the upper part 435, when the anchor 400 is inserted into the aperture 603 and the rack aperture 550' and when projected onto the horizontal plane 471, a contour of the upper part 435 is pentagonal and congruent with the pentagonal shape of the aperture 603. The pentagonal shape allows to position the anchor 400 in only one orientation with respect to the holder 600. For example, in some cases, it is preferred that the anchor 400 be positioned with the lever 414 away from the holder 600, in order to access and operate the lever 414. Thus, the pentagon shape of the upper part 435 allows to position the anchor 400 in the aperture 603 with the lever 414 disposed away from the holder 600. It is contemplated that the upper part 435 of the middle flange 434 could be of a different shape. It is contemplated that, the upper part 435 of the middle flange 434 could have an irregular hexagonal contour. It is contemplated that, the upper part 435 could not be congruent with the aperture 603. It is also contemplated that, the upper part 435 could be a vertical wall having a hexagonal contour congruent with the rack aperture 550'.

In other cases, such as in the embodiment of the anchor 8, there is no recess 430 present between the upper flange 432 and the middle flange 434. Rather, as shown in FIG. 1C for example, a pair of slots are disposed on opposite sides of the upper part, each extending on a portion of the counter of the upper portion and on a portion of a height of the upper part.

Turning back to FIGS. 17 to 20, the lower part 436 of the middle flange 434 is congruent with the rack aperture 550'. When the anchor 400 is inserted into the rack aperture 550', a contour of the lower part 436, projected onto the horizontal plane 471, is contained within the contour of the upper part 435. The contour of the lower part 436 is hexagonal and congruent with a contour of the rack aperture 550'. The lower part 436 is chamfered, and the chamfer is congruent with the chamfered upper brim 553' of the rack aperture 550'. It is contemplated that the chamfered lower part 436 could be omitted. It is also contemplated that the lower part 436 could be different from chamfered. The lower part 436 is the part of the middle flange 434 that constitutes an element of the rack connecting part.

The recess 430 is formed by and between the upper flange 432 and the middle flange 434. When projected onto the horizontal plane 471, a contour of the recess 430 is pentagonal, and congruent with the pentagonal shape of the aperture 603. It is contemplated that the recess 430 could have a shape different from a congruent shape with the aperture 603. The recess 430 receives a seal 431 (shown in FIG. 19). The seal 431 creates a friction fit between the anchor 400 and the holder 600. In the case where the aperture 603 is located on the holder body 601, the seal 431 also prevents dirt from entering into the holder 600. When installing the holder 600 or whenever the holder 600 is not used, the seal 431 keeps the anchor 400 temporarily positioned with the holder 600. The seal 431 has a pentagonal shape 431, congruent with the shape of the recess 430. The seal 431 is made of rubber. It is also contemplated that the seal 431 could be made of any resilient material. It is contemplated that the seal 431 could cover only a portion of the recess 430. It is contemplated that the seal 431 could be watertight. It is also contemplated that the seal 431 could be omitted.

A pair of tabs 403 (shown best in FIGS. 17 and 18) extends downwardly vertically from the lower part 436 of the middle flange 434. It is contemplated that the pair of tabs 403 could extend downwardly and inwardly from the lower part 436 of the middle flange 434. When the anchor 400 is inserted into the aperture 603 of the holder 600 and into the rack aperture 550', a contour of the tabs 403, projected onto the horizontal plane 471, is contained within the contours of the rack aperture 550' and the aperture 603. Thus, when the anchor 400 is inserted in the rack aperture 550', the tabs 403 are disposed by the rim 552' of the rack aperture 550'. It is contemplated that the tabs 403 could abut the rim 552' of the rack aperture 550' when inserted therein. A shape of the tabs 403 is congruent with the hexagonal shape of the rack apertures 550'. The tabs 403 have an irregular hexagonal shape. The tabs 403 have a longitudinal direction along the longitudinal axis 473 (shared with the middle flange 434). The tabs 403 have a thickness which is smaller than a thickness of the rack 500'. The tabs 403 can provide guidance to insert the anchor 400 in the rack aperture 550', as well as additional strength to the connection between the anchor 400 and the rack 500'. It is contemplated that the tabs 403 could have a shape different from a hexagon. It is also contemplated that one or both tabs 403 could be omitted. It is contemplated that more than two tabs 403 could extend from the middle flange 434.

Two connectors 450 (shown in FIG. 17) are disposed on opposite sides of the case 402, and a connector 451 is disposed on top of the case 402 between the two connectors 450. The two connectors 450 are triangular apertures, and the connector 451 is a generally trapezoidal aperture. When desired, the connectors 450, 451 can be used to hook a bungee cord 610 to the anchor 400, as described above with respect to FIG. 16. It is contemplated that the case 402 could have no, only one, or more than two connectors 450, and no or more than one connector 451. It is contemplated that the connectors 450, 451 could be disposed at different locations on the case 402. It is contemplated that the connectors 450, 451 could have different shapes. It is also contemplated that the connectors 450, 451 could be designed differently. For example the connectors 450, 451 could be hooks.

A vertical wall 452 (shown in FIG. 19) is disposed on one side of the case 402. When desired, the vertical wall 452 can be used as an abutment wall to the box 612, as described above with respect to FIG. 16. It is contemplated that the case 402 could have no or more than one vertical wall 452. It is contemplated that the wall 452 could not be vertical.

The latch 404 will now be described. The latch 404 has a cylindrical latch body 441 and a pair of cams 442 extending outwardly from an end of the latch body 441 opposite to the splined end 410. The pair of cams 442 constitutes another element of the rack connecting part. It is contemplated that the latch body 441 could have a shape different from cylindrical. It is contemplated that one or more than two cams 442 could be connected to the latch body 441 depending on a shape of the rack aperture 550'. The pair of cams 442 constitutes a lower flange of the anchor 400. When the anchor 400 is inserted into the rack aperture 550' and when projected onto the horizontal plane 471, the pair of cams 442 (mounted on the latch 404) has a hexagonal shape that is congruent with the rack aperture 550'. The hexagon is irregular and has a longitudinal direction along a longitudinal axis 475 (shown in FIGS. 17 and 18).

The pair of cams 442 is rotatable via the lever 414 between a first position and a second position. Rotation of the cams 442 is illustrated by arrow 420 in FIGS. 18 and 22. In the first position (shown in FIG. 18 in dotted lines, and in FIG. 21), the anchor 400 is unlocked (i.e. free from the rack 500' and the holder 600), and the pair of cams 442 has a same orientation as the tabs 403. As shown in FIG. 21, in the first position, the longitudinal axes 473 and 475 of the middle flange 434 and cams 442, respectively, are aligned and form an angle of 0 degrees with respect to each other. When projected onto the horizontal plane 471, in the first position, a hexagonal contour of the cams 442 is contained within the pentagonal contour of the aperture 603 and the hexagonal contour of the rack aperture 550'. When in the first position, the cams 442 are insertable through the aperture 603 and the rack aperture 550' to position the anchor 400 on the rack 500'. It is contemplated that, in the first position, the longitudinal axes 473 and 475 could not be aligned with each other and could be at an angle with each other different from 0, as long as when projected onto the horizontal plane 471, the hexagonal contour of the cams 442 is contained within the hexagonal contour of the rack aperture 550' for inserting the cams 442 into the rack aperture 550'.

In the second position (as shown in FIG. 18 in solid lines, and FIG. 22), the anchor 400 is locked, and the pair of cams 442 is positioned perpendicular to the tabs 403. As shown in FIG. 22, in the second position, the longitudinal axes 473 and 475 are perpendicular to each other and form an angle of 90 degrees with respect to each other. It is contemplated that the longitudinal axes 473, 475 could form an angle other than 90 degrees. When projected onto the horizontal plane 471, in the second position, the hexagonal contour of the cams 442 extends beyond the hexagonal contour of the rack aperture 550'. When inserted in the rack aperture 550' and in the second position, the anchor 400 is secured to the rack 500' and the pair of cams 442 and the middle flange 434 brace the rack aperture 550' (rack connecting part). As will be described below, if the anchor 400 is inserted both in the aperture 603 and the rack aperture 550', in the second position, the middle flange 434 and the cams 442 brace the holder 600 against the rack 500' (accessory connecting part), thus securing the holder 600 to the rack 500'.

Each of the cams 442 has a cam surface 444 (shown in FIG. 17) which slides against the ribs 548' of the rack 500' when the cams 442 are rotated between the first and the second position by the lever 414. The cam surface 444 includes an inclined surface 447. The inclined surface 447 is a ramp used in conjunction with the spring washers 408 to bias the cam 442 upward toward the middle flange 434.

The anchor 400 can be used in several ways. In a first example, the user desires to retain an item (e.g. box 612) onto the rack 500' using the bungee cord 610, similar to what is shown in FIG. 16. To do so, the user grabs an anchor 400 and selects a rack aperture 550' in function of where and how he/she desires to retain the accessory box 612. If not already done, the user moves the anchor 400 to the unlocked position (cams 442 in the first position) by rotating the lever 414 by a quarter-turn clockwise until the lever 414 extends beyond the case 402. The latch body 441 then moves by a quarter-turn from a position where the cams 442 are perpendicular to the tabs 403 (cams 442 in the second position), to a position where the cams 442 are in a same direction as the tabs 403 (cams 442 in the first position). Once the anchor 400 is in the unlocked position, the user positions the anchor 400 in the rack aperture 550'. The lower part 436 of the middle flange 434 abuts against the upper brim 553' of the rack aperture 550'. Once in place, the user moves the lever 414 by quarter-turn counterclockwise for locking the anchor 400 to the rack 500'. By moving the lever 414, the latch body 441 moves by a quarter-turn from the position where the cams 442 had the same orientation as the middle flange 434 (cams 442 in the first position), to the position where the cams 442 are perpendicular to the middle flange 434 (cams 442 in the second position). During this motion, the inclined surfaces 447 slid against the ribs 548' until the cam surface 444 becomes in contact with the ribs 548'. When the anchor 400 is locked to the rack 500', the user can position the box 612 by the anchor 400 (this step could also be done before locking the anchor 400 to the rack 500'). The user connects an end of the bungee cord 610 to the aperture 450 of the anchor 400, wraps the bungee cord 610 around the box 612 and attaches the other end of the bungee cord 610 to the rack 500' or to another anchor 400 (previously or not) secured onto the rack 500'.

To detach the box 612 from the rack 500', the user releases the bungee cord 610 from the aperture 450 of the anchor 400, and removes the box 610 from the rack 500'. If the user desires further to unsecure the anchor 400 from the rack 500', the user moves the lever 414 by a quarter-turn clockwise, thereby moving the cams 442 back to the position where they are aligned with the middle flange 434 (cams 442 in the first position). The user can then remove the anchor 400 from the rack aperture 550'. The user can reuse the anchor 400 again at a later time for a same or a different application.

In an alternative embodiment where the anchor 400 does not have the lever 414 and the latch 404 connected to move with the case 402, the user could secure the anchor 400 to the rack 500' by inserting the anchor 400 into the rack aperture 550'. The user would then turn the anchor 400 so as to have the middle flange 434 and the cams 442 (now forming a lower flange) bracing the brims of the aperture 550'. To detach the anchor 400 from the rack 500', the user could turn the anchor 400 back to a position where the flanges 434, 442 of the anchor 400 are aligned with the aperture 550, and remove the anchor 400 from the rack aperture 550'.

Instead of or in addition of using the bungee cord 610, the user can use the vertical wall 452 as an abutment surface to the box 612, similarly to what has been described above with respect to FIG. 16. The user can select one of the rack apertures 550' and position the anchor 400 in the selected rack aperture 550' in such a way that the box 612 will have its motion constrained at least by the abutment wall.

In a second example, the user can use the anchor 400 for securing the holder 600 to the rack 500'. To do so, the user grabs two anchors 400 and the holder 600, and selects two of the rack apertures 550' that are located at positions that allow to place the holder 600 where desired. The user first places the holder 600 on the top face of the rack 500', so that the apertures 603 and 550' are disposed one on top of the other in a way to allow insertion of the anchor 400 through the apertures 603 and 550'. It is contemplated that the apertures 603 and 550' could be aligned or could be disposed at a slight angle with respect to each other, as long as the contour of the rack aperture 550' is contained within the contour of the aperture 603, so as to allow insertion of the anchor 400. The user then inserts the anchors 400, being in the unlocked position, into the apertures 603, 550'. When the anchor 400 is in the rack aperture 550', the middle flange 434 abuts against the upper brim 553' of the rack aperture 550' and the upper flange 432 abuts against the upper brim 605 of the aperture 603. To secure the holder 600 to the rack 500', the user locks the anchors 400 to the rack 500' one after the other, in a manner similar to the one described above, by moving the lever 414 so as to engage the pair of cams 442 with the rack 500'. When the cams 442 are rotated and perpendicular to the middle flange 434, the anchor 400 also secures the holder 600 to the rack 500'. The user can then fill the holder 600 with items. It is contemplated that the user could fill the holder 600 with items before securing the holder 600 to the rack 500'. It is also contemplated that the user could use the bungee cord 610 to further secure the holder 600 or the items it transports onto the rack 500'.

It is contemplated that, the user could also secure two holders 600 (as an example of two accessories) with a same anchor 400 to secure the holders 600 together disposed side-by-side in cases where the shapes of the upper part 435 of the middle flange 434 and the apertures 603 of the holders 600 would allow it (e.g. the upper part 435 is irregular and the apertures 603 of each holder 600 are oriented differently, or e.g. the upper part 435 and the apertures 603 of each holder 600 have a same regular shape). The user would dispose one abutment tab 602 so as to align the apertures 603 of each abutment tab 602 of each holder 600, and insert the anchor 400 into the accessory apertures 603 and the aperture 550' of the rack 500'. The user would proceed as described above to secure the two holders 600 to the rack 500'. Using two other anchors 400, the user would then secure the other abutment tabs 602 of each holder 600 to the rack 500', conveniently with two other rack apertures 550'.

Also, a same anchor 400 could be used to secure partially an accessory and an item. For example, one anchor 400 could be used to secure one side of the holder 600. That same anchor 400 could also be used as a hooking point for the bungee cord 610 to retain the box 612 to the rack 500', the box 612 having been priory disposed adjacent to the holder 600. Another anchor 400 could be used to secure another side of the holder 600 for further securing the holder 600 to the rack 500', and yet another anchor 400 could be used to secure another end of the bungee cord 610 to the rack 500'.

To unlock each anchor 400, the user moves the lever 414 back so as to orient the cams 442 in the same direction as the middle flange 434, in a manner similar to the one described above. The user then removes the anchor 400 from the rack 500' and the holder 600. By removing the anchor 400 from the rack 500', the user also removes the anchor 400 from the holder 600. The user can then use each of them at a later time for a same or a different application.

The invention claimed is:

1. An anchor for use with a rack connected to a vehicle, comprising:
    an anchor case, the anchor case having a rack connecting part for making contact with the rack and an accessory connecting part for making contact with an accessory;
    at least one cam rotatably connected to the anchor below the rack connecting part, the at least one cam being rotatable about an axis between a locked position and an unlocked position to selectively secure the anchor and the accessory to the rack; and
    a lever operatively connected to the at least one cam, the lever being rotatable by a user in order to cause the at least one cam to rotate between the locked position and the unlocked position,
    the rack connecting part being positioned between the at least one cam and the accessory connecting part along the axis.

2. The anchor of claim 1, wherein the lever rotates away from at least a portion of the accessory connecting part when rotating from the locked position toward the unlocked position.

3. The anchor of claim 1, wherein the accessory connecting part abuts and biases the accessory towards the rack when the lever is rotated from the unlocked position to the locked position.

4. The anchor of claim 3, wherein when the lever is placed in the locked position:
    the accessory connecting part secures the accessory, the accessory connecting part impeding the accessory from lifting and sliding with respect to the rack.

5. The anchor of claim 1, wherein the accessory connecting part and the rack connecting part are integrally formed with the anchor case.

6. The anchor of claim 1, further comprising a biasing mechanism biasing the at least one cam towards the anchor case.

7. The anchor of claim 6, further comprising a latch, the at least one cam extending from a first end of the latch; and
    wherein the latch includes splines at a second end of the latch.

8. The anchor of claim 7, further comprising:
    a stem passing through the latch, the anchor case and at least a portion of the lever, the stem including a first end and a second end; and
    a fastener installed on the first end of the stem; and wherein:
the stem pivotally connects the latch and the lever to the anchor case;
the first end of the stem is disposed nearer to the at least one cam;
the biasing mechanism is disposed at the first end of the stem and adjacent the at least one cam; and
the fastener impedes the biasing mechanism from being removed from the stem, the fastener compressing the biasing member biasing the cam towards the anchor case.

9. The anchor of claim 7, wherein the at least one cam comprises two cams extending in opposite directions from the latch.

10. The anchor of claim 7, wherein the latch, the splines and the at least one cam are integrally formed as a single-piece component.

11. The anchor of claim 7, wherein the lever has splines that are mated with the splines of the latch.

12. The anchor of claim 6, wherein the biasing mechanism comprises at least one of: a spring washer, a coil spring and a resilient member.

13. An accessory rack comprising:
a frame having a first end and a second end opposite the first end;
a tongue fastener at the first end; and
the anchor of claim 1 integrated with the frame at the second end.

14. A system for securing an accessory to a vehicle, the system comprising:
a rack configured to be connected to the vehicle, the rack defining a rack aperture; and
the anchor of claim 1 selectively secured to the rack and configured to brace the accessory against the rack, the anchor being selectively inserted into the rack aperture.

15. The system of claim 14, wherein the at least one cam comprises two cams extending in opposite directions from the latch.

16. The system of claim 14, wherein:
the latch has a first end and a second end;
the at least one cam is closer to the second end than the first end; and
the latch has splines at the first end to operatively connect the latch to the lever.

17. The system of claim 16, wherein the latch, the splines and the at least one cam of the anchor are integrally formed as a single-piece component.

* * * * *